United States Patent [19]

Wuchinich

[11] Patent Number: 5,171,387

[45] Date of Patent: Dec. 15, 1992

[54] ULTRASONIC COMB HORN AND METHODS FOR USING SAME

[75] Inventor: David G. Wuchinich, New York, N.Y.

[73] Assignee: Sonokinetics Group, Hoboken, N.J.

[21] Appl. No.: 698,764

[22] Filed: May 10, 1991

Related U.S. Application Data

[62] Division of Ser. No. 467,624, Jan. 19, 1990, Pat. No. 5,057,182.

[51] Int. Cl.$^5$ ..................... B32B 31/16; B29C 65/00
[52] U.S. Cl. .................... 156/73.3; 156/73.1; 156/73.4; 156/580.1; 156/580.2; 264/23
[58] Field of Search ............. 156/73.1, 73.3, 73.4, 156/580.1, 580.2; 310/323, 325, 328; 228/1.1, 110; 264/23; 425/174.2; 15/320, 321, 382

[56] References Cited

U.S. PATENT DOCUMENTS

| | | | |
|---|---|---|---|
| 2,242,120 | 5/1941 | Gardiner | 310/342 |
| 2,270,922 | 1/1942 | Bechmann et al. | 310/342 |
| 2,321,358 | 6/1943 | Bokovoy | 310/342 X |
| 3,056,698 | 10/1962 | Kleesattel et al. | 134/1 |
| 3,089,790 | 5/1963 | Balamuth et al. | 134/1 |
| 3,113,225 | 12/1963 | Kleesattel et al. | 310/26 |
| 3,524,085 | 8/1970 | Shoh | 310/8.2 |
| 3,660,186 | 5/1972 | Sager et al. | 156/73 |
| 3,939,033 | 2/1976 | Grgach et al. | 156/580.2 X |
| 4,011,474 | 3/1977 | O'Neill | 310/328 |
| 4,012,647 | 3/1977 | Balamuth et al. | 310/323 |
| 4,044,174 | 8/1977 | Carr | 427/130 |
| 4,069,541 | 1/1978 | Williams et al. | 15/73.1 |
| 4,225,803 | 9/1980 | Goof | 310/325 X |
| 4,315,181 | 2/1982 | Holze, Jr. | 310/323 |
| 4,326,903 | 4/1982 | Summo | 156/73.1 |
| 4,334,168 | 6/1982 | Besson et al. | 310/343 |
| 4,352,570 | 10/1982 | Firth | 310/325 X |
| 4,356,590 | 11/1982 | Goldsmith | 15/321 |
| 4,363,992 | 12/1982 | Holze, Jr. | 310/323 |
| 4,385,413 | 5/1983 | Goldsmith | 15/322 |
| 4,414,045 | 11/1983 | Wang et al. | 425/174.2 X |
| 4,483,571 | 11/1984 | Mishiro | 310/323 |
| 4,529,115 | 7/1985 | Renshaw et al. | 228/1.1 |
| 4,530,138 | 7/1985 | Ritter | 310/325 X |
| 4,534,819 | 8/1985 | Payet et al. | 425/174.2 X |
| 4,583,365 | 4/1986 | John | 60/528 X |
| 4,605,454 | 8/1986 | Sayovitz et al. | 156/73.1 |
| 4,607,185 | 8/1986 | Elbert et al. | 310/323 |
| 4,633,119 | 12/1986 | Thompson | 310/325 |
| 4,647,336 | 3/1987 | Coenen et al. | 156/580.1 |
| 4,651,043 | 3/1987 | Harris et al. | 310/323 |
| 4,652,785 | 3/1987 | Gabriel et al. | 310/325 |
| 4,690,722 | 9/1987 | Flood | 156/510 |
| 4,713,132 | 12/1987 | Abel et al. | 156/73.1 |
| 4,715,078 | 12/1987 | Howard et al. | 15/4 |
| 4,749,437 | 6/1988 | Welter | 156/580.1 |
| 4,750,488 | 6/1988 | Wuchinich et al. | 128/303 R |
| 4,758,293 | 7/1988 | Samida | 156/73.1 |
| 4,762,668 | 8/1988 | Loose et al. | 310/26 X |
| 4,770,730 | 9/1988 | Abe | 156/73.1 |
| 4,823,783 | 4/1989 | Willhite, Jr. et al. | 128/156 |
| 4,885,499 | 12/1989 | Ueha et al. | 310/325 X |

OTHER PUBLICATIONS

Rayleigh, The Theory of Sound, vol. 1., 1894, pp. 255–305.
Eisner, Physical Acoustics, 1964, pp. 353–363.
Neppiras, The Pre-Stressed Piezoelectric Sandwich Transducer, 1973, pp. 295–302.
Rozenberg, Sources of High-Intensity Ultrasound, vol. 2., 1973, pp. 111–114.
Emsinger, Ultrasonics, 1988, pp. 419–492.

Primary Examiner—David A. Simmons
Assistant Examiner—J. Sells
Attorney, Agent, or Firm—Pennie & Edmonds

[57] ABSTRACT

A unitary extended width comb horn for generating ultrasonic vibrations over a width of greater than 12 inches for a frequency of 20 kHz wherein such vibrations vary by less than ±10% across the width of the horn. Also, processes utilizing this horn and related devices incorporating same.

31 Claims, 18 Drawing Sheets

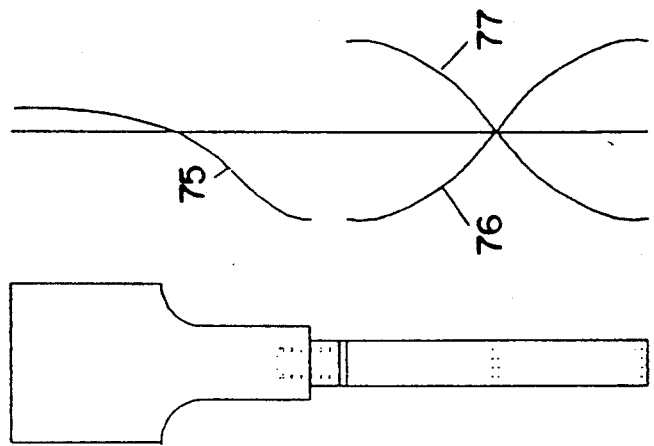
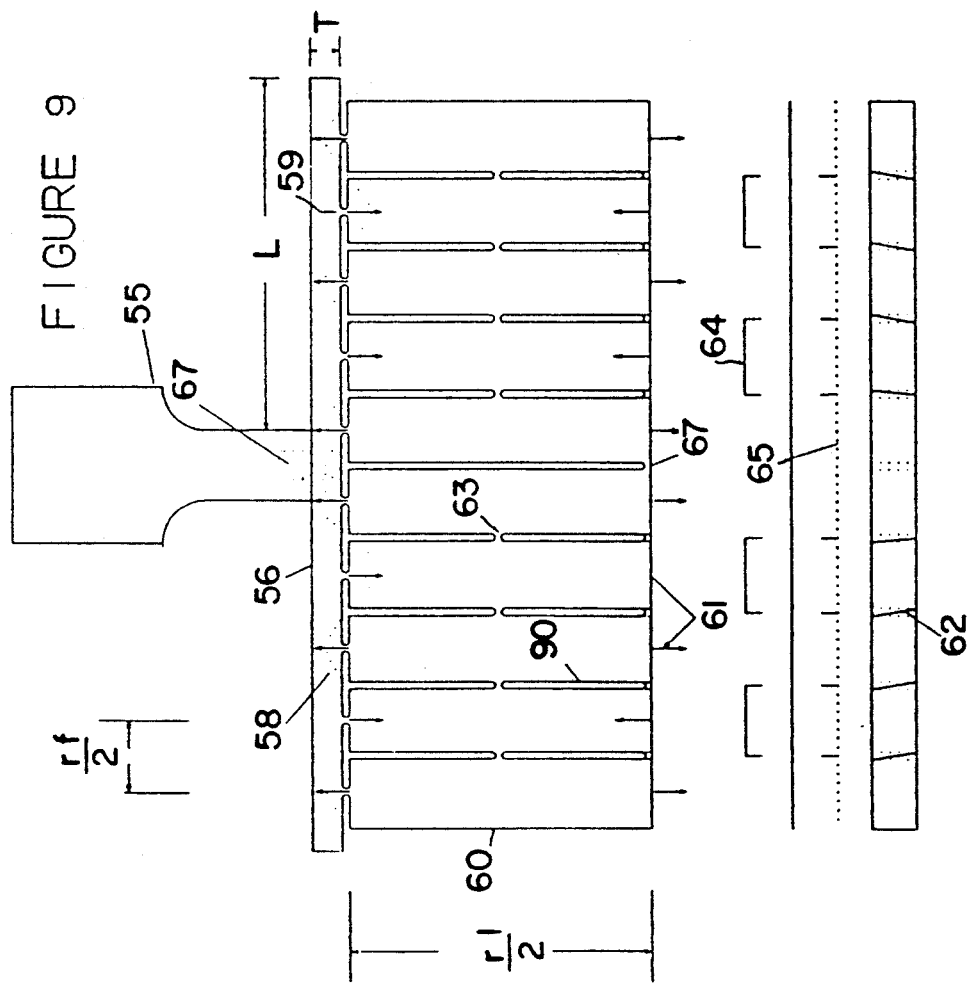
FIGURE 9
FIGURE 10
FIGURE 11

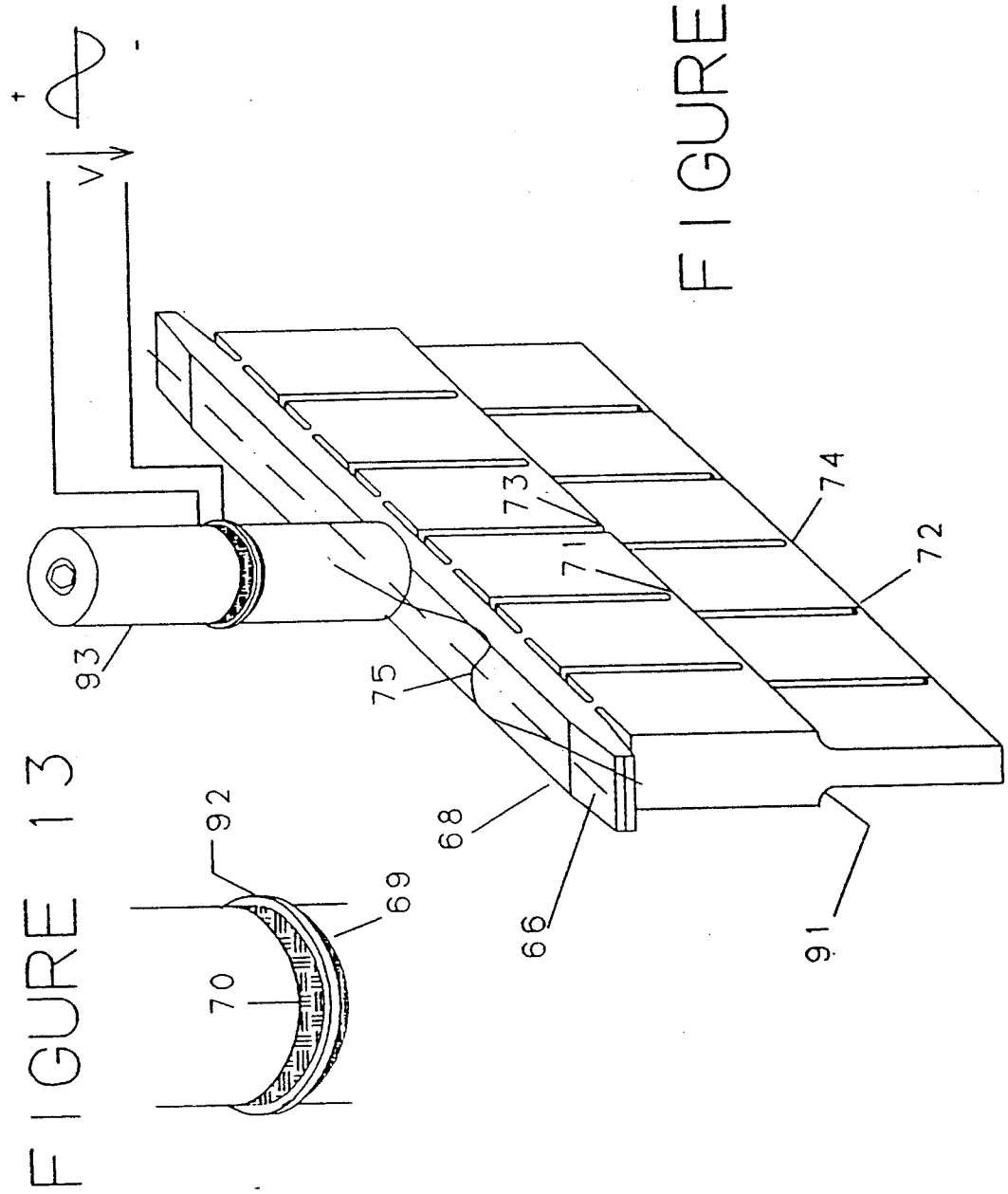

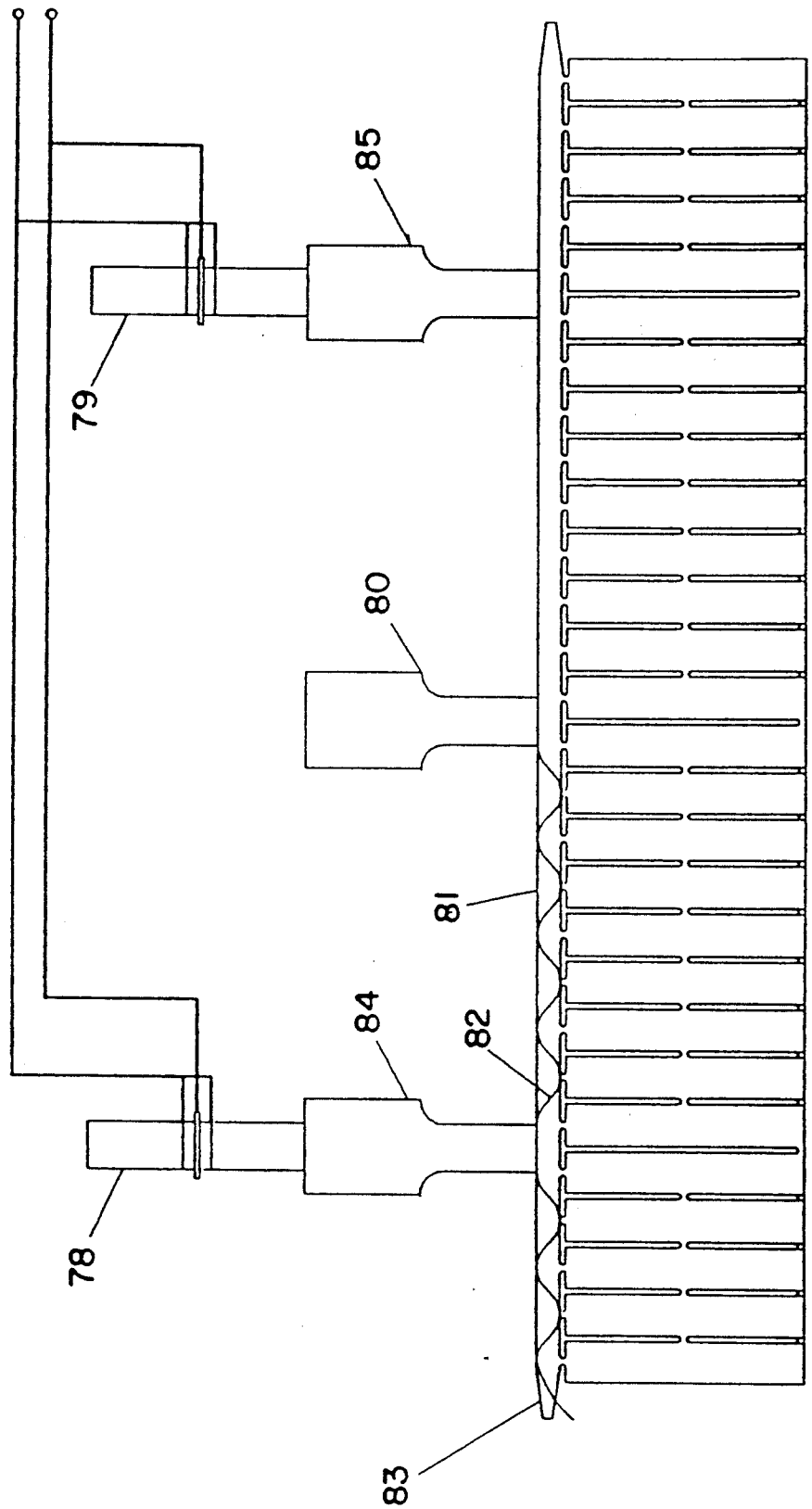

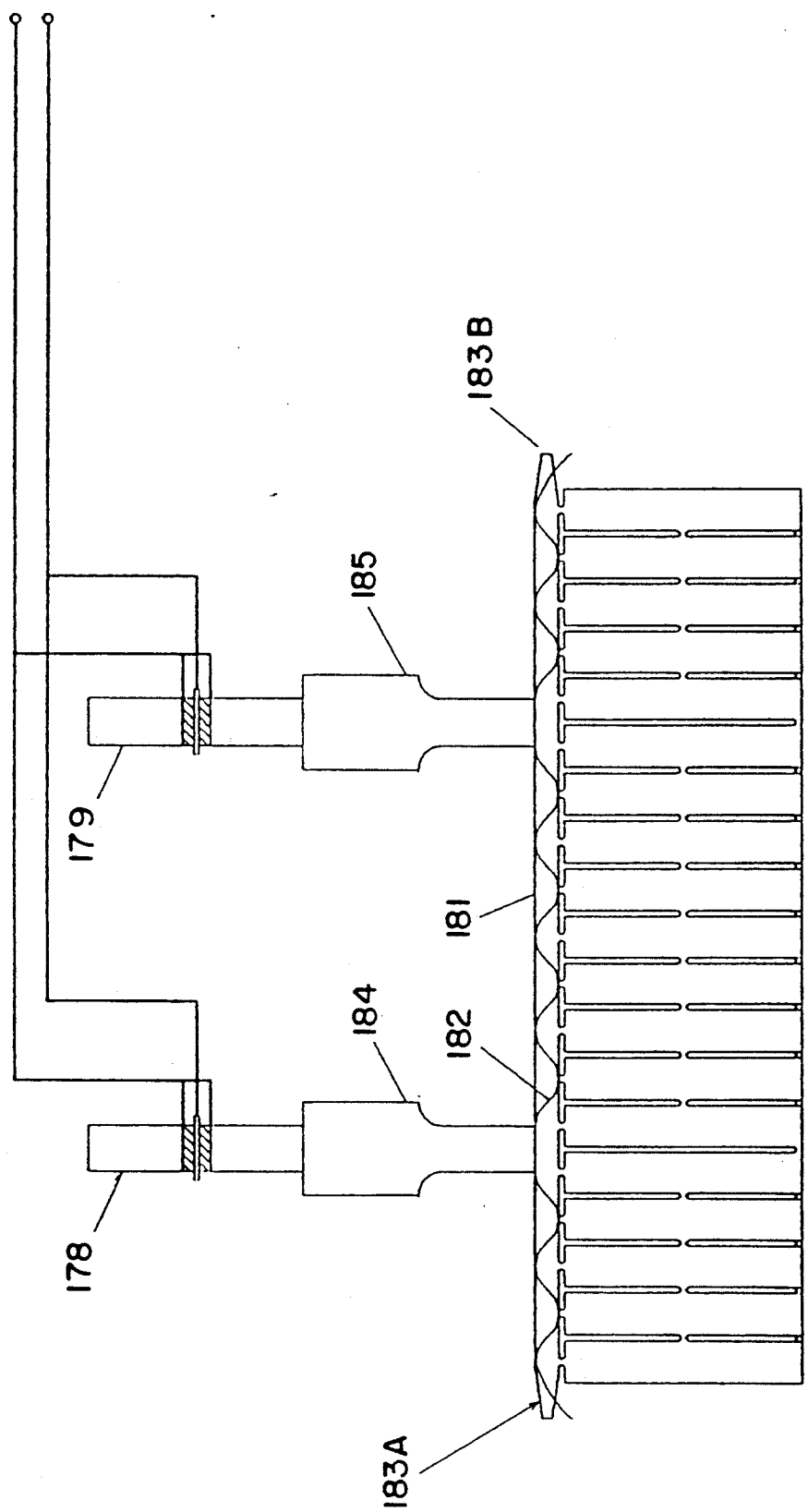

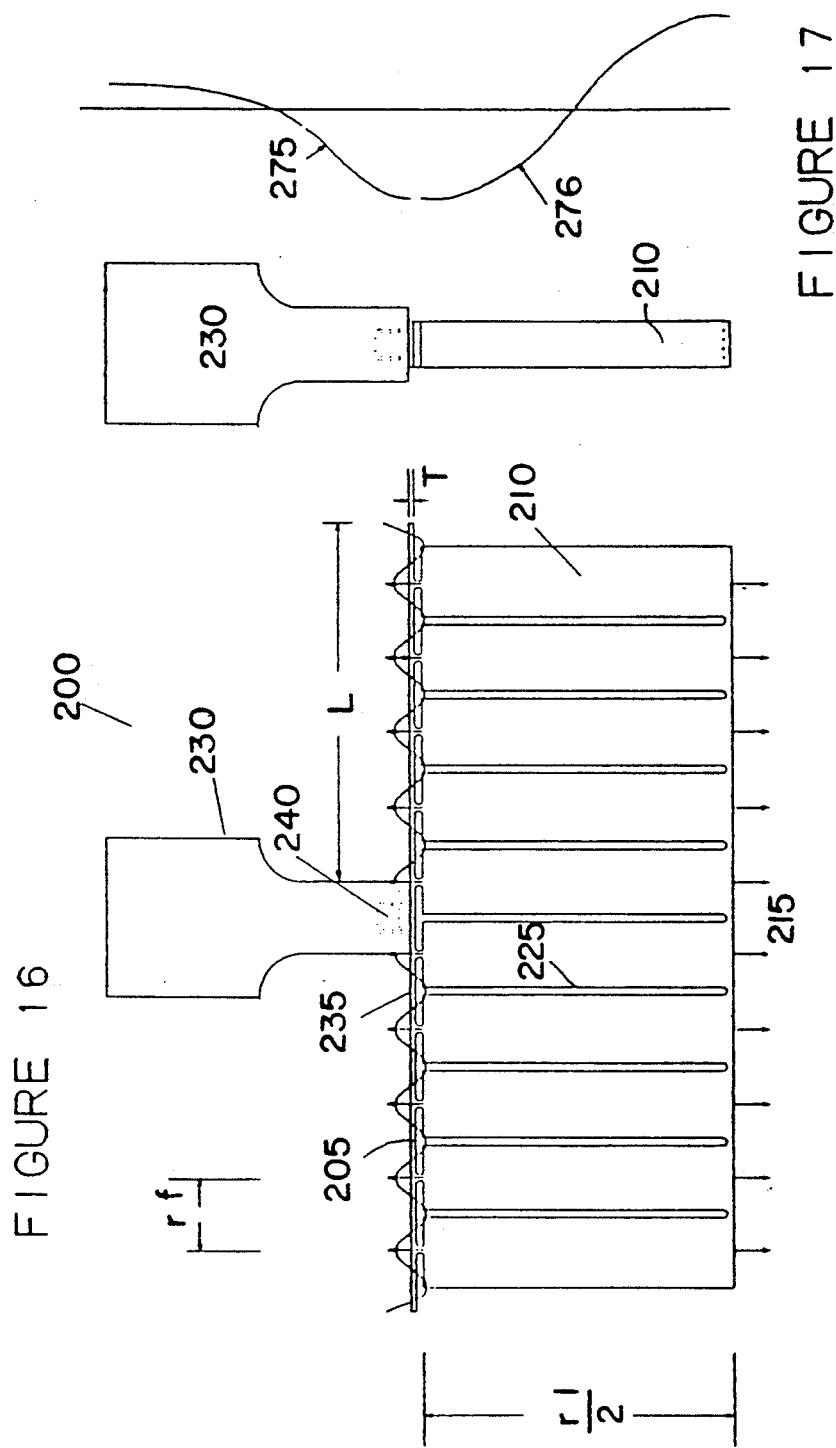

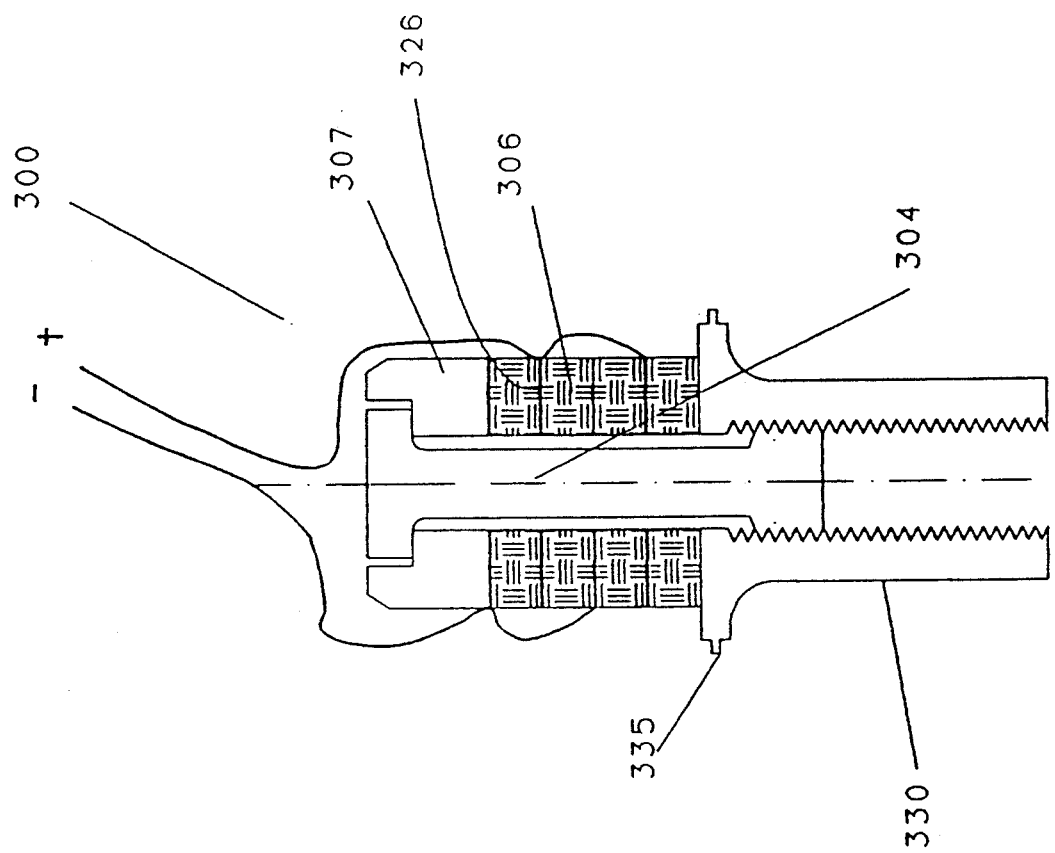

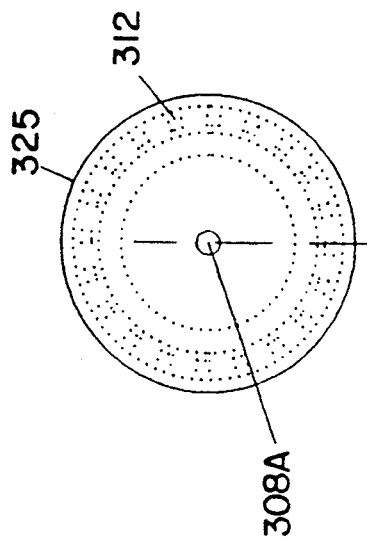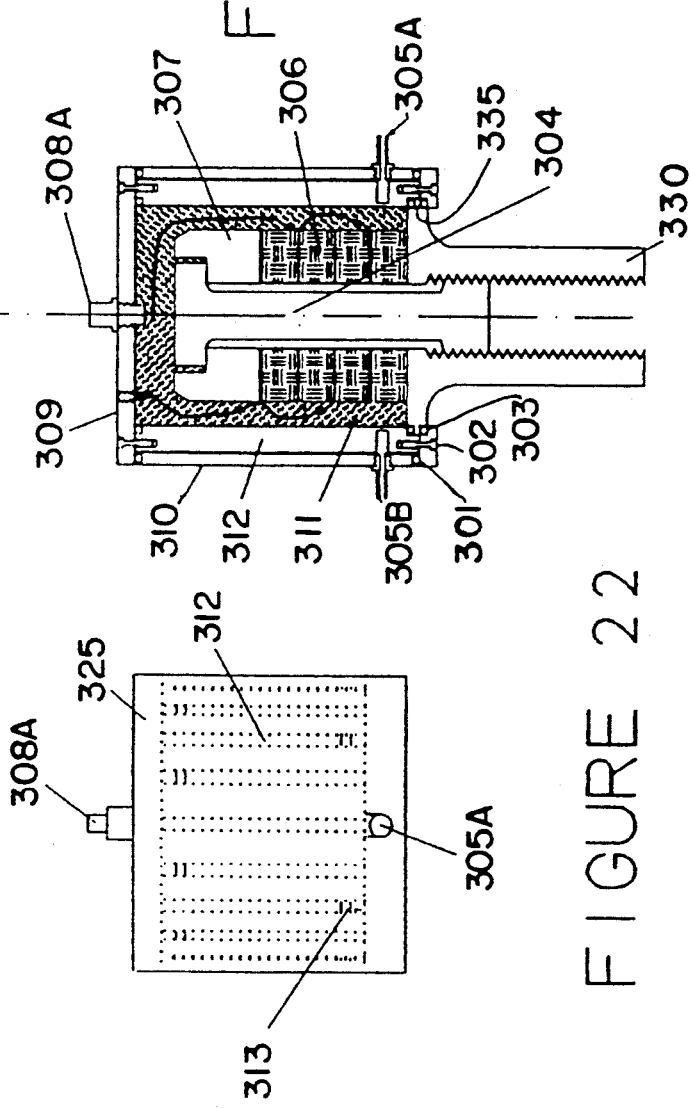

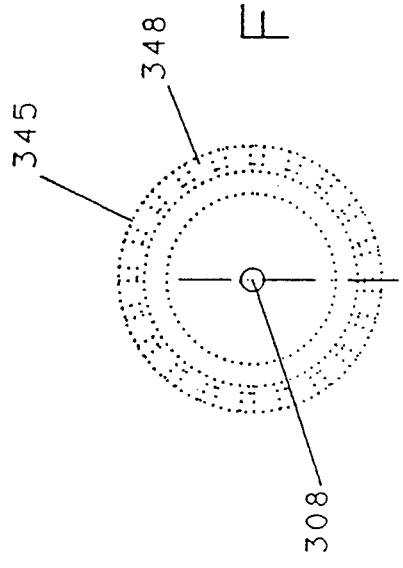
FIGURE 24
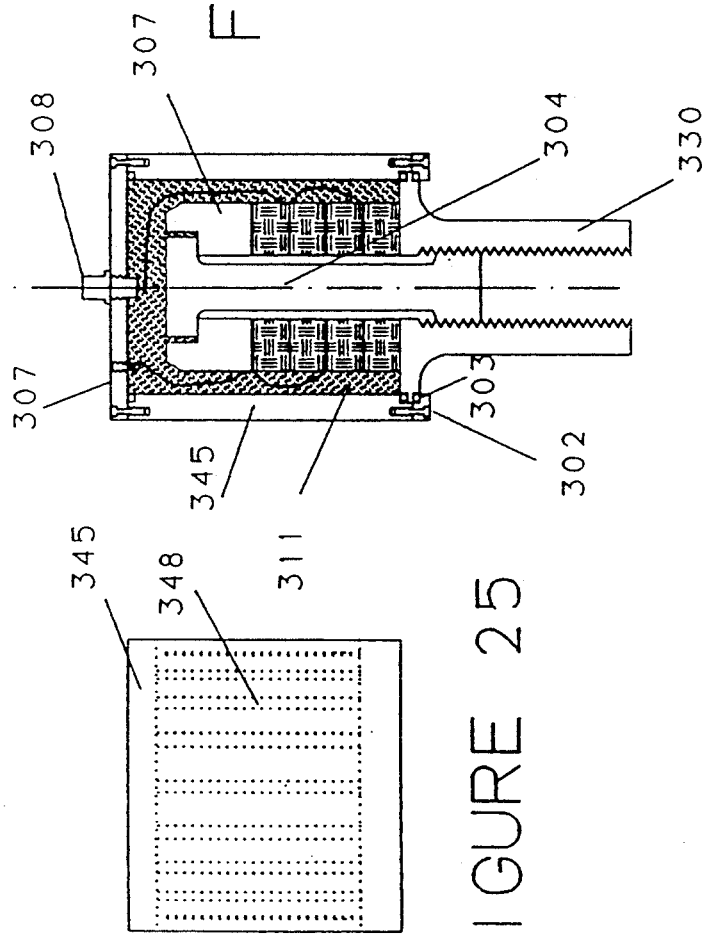
FIGURE 23
FIGURE 25

ULTRASONIC COMB HORN AND METHODS FOR USING SAME

This is a division of application Ser. No. 07/467,624, filed Jan. 19, 1990, now U.S. Pat. No. 5,057,182.

TECHNICAL FIELD

The present invention relates to an apparatus capable of generating ultrasonic vibrations for a wide range of applications including cleaning, joining, fragmenting, forming, drying and dewatering of various materials. In particular, this apparatus is an extended width slotted comb horn for generating such ultrasonic vibrations.

BACKGROUND ART

The use of mechanical vibration produced at an ultrasonic frequency to weld thermoplastics, to clean and degrease materials and to emboss and form plastics is a well-established art in industrial processes (see, e.g., Ensminger, Ultrasonics, 1988, pp. 419-492). The physical principles underlying this technology have important relations to the invention described herein and therefore require review and discussion.

FIG. 1 shows an ultrasonic transducer 1 attached to a horn 2. The design and operation of such transducers, powered by piezoelectric crystals 3 is well known (see, e.g., Neppiras, Ultrasonics International 1973 Conf. Proc., pp. 295-302). To obtain significant vibrational motion, most systems are operated at one of their frequencies of extensional resonance. Both the transducer and horn are designed to resonate at the same frequency, in which case an extension, $\epsilon$, produced by the transducer at its ends is communicated to the horn. Since the horn is tuned to the same frequency as the transducer, it expands and contracts along its length in concert with the imposed motion. Because the overall length of the transducer and horn is an important consideration in practical equipment, the systems are usually designed to vibrate at their first mode of extensional resonance, for which the horn's length must be $\Gamma/2$ where $\Gamma = c/f$, c is the velocity of sound in the horn material, and f is the chosen frequency of vibration. The motion produced at the free face of the horn is then reciprocal, or back and forth in the plane of the page, with an amplitude determined by the electrical voltage 4 applied to the transducer crystals. The diagram in FIG. 1 shows the variation 12 of extension, $\epsilon$, along the length of the structure.

Vibration of any rigid structure is always accompanied by stress. Because the piezoelectric crystals are fabricated from ceramic material they have a very limited tolerance to cyclic stress. For example, metals such as stainless steel or titanium can tolerate an indefinite number of cycles of tension and compression at levels from 10,000 to 40,000 psi. Ceramics, however, can not be exposed to cyclic stress much above 3,000 psi without the production of substantial internal heating and fracture. This limit is particularly pronounced when the stress is produced at ultrasonic frequencies ($\geq 18$ kHz). In the half wave design shown in FIG. 1, the maximum stress occurs in the crystals, limiting therefore the maximum extension, $\epsilon$, to about 0.001 inch, p-p (peak to peak) at a frequency of 20 kHz. Very often practical applications require that the horn face vibrate with amplitudes in the range of 0.003 to 0.006 inch, p-p. For example, in the welding of polyester or polypropylene, vibration amplitudes of 0.003 to 0.0004 inch, p-p, are commonly used.

For applications where vibration amplitudes greater than those produced by the transducer itself are required, velocity transformers have been developed. FIG. 2 shows one such transformer or booster horn 5. This horn, which is interposed between the transducer 6 and the working horn 7, and serves to multiply the extension produced by the transducer by a number greater than one. Again, the transducer 6, booster horn 5 and working horn 7 are each designed to have the same resonant frequency. Many designs are available for such boosters and they have been thoroughly reviewed with respect to geometry and performance by others (see, e.g., Eisner, Physical Acoustics, 1964, pp. 353-363). The booster shown in FIG. 2 is a "stepped" horn in which two solids of constant, but different, cross sectional areas are joined in the region 13 of minimal extension.

It is also possible to incorporate amplification into the working horn, thus obviating the booster, as is shown in FIG. 3. The input extension 9 produced by the transducer 8 is amplified by the horn 10 to produce an increase in output extension at the working face 11. This horn 10 is also of the stepped design.

Ultrasonic vibration produced by the structures shown in FIGS. 1 to 3 have been commercially applied to continuous industrial processes include laminating, wet or dry cleaning, atomizing, machining or drilling, rolling, densification, grinding, deburring, dewatering, soldering, welding, cutting and the like. The Emsinger text referred to above provides additional details of such processes which need not be repeated here.

The principle problem encountered in applying resonant ultrasonic vibration to these continuous processes is the limitation on horn width. Although the horn executes motion principally of contraction and extension, because the horn is invariably made of metal composed of molecules in a crystalline lattice it also expands and contracts in its width. FIG. 4 shows a rectangular structure subjected to a stress, $\sigma$, in the direction shown. In a resonator this stress will be a function of the vertical dimension, x. Hence $\sigma$, is shown as $\sigma(x)$. This stress produces a lateral contraction $\delta$ that is proportional to $\sigma$ and the lateral coordinate, w. The constant of proportionality is known as Poisson's Ratio.

FIG. 5 shows the form of motion along the perimeter of the horn that results from a combination of vertical and lateral motion. Normally, if the width of the horn is much smaller than its length, lateral contraction and dilation changes very little the direction and magnitude of the essentially vertical oscillation. However as the width approaches the length, lateral motion becomes substantial and begins to contribute a tangential component to the movement of the horn's surfaces. Moreover, when the width is made equal to $\Gamma/2$ lateral resonance occurs as shown in FIG. 6. Under this condition, the motion of the horn face varies from purely extensional at its center to velocity directed at a 45 degree angle to the face at its ends.

Tangential motion is usually not desired in welding, drying, cleaning or atomizing processes because in all such applications it is the component of motion perpendicular to the material that accomplishes the intended work. Hence, simple prismatic ultrasonic horns are limited in their width to a fraction of $\Gamma/2$. For most metals, $\Gamma$ is about 10 inches at a frequency of 20 kHz. Therefore, horn width must be less than 5 inches, and for the development of fairly uniform vibration amplitude across the horn face the width must be less than about 3 inches. While it is possible to increase $\Gamma$ by lowering the frequency, once the frequency becomes audible (<18 kHz) the incidental air borne sound emitted is hazardous to hearing. As a practical lower limit therefore, 18 kHz is used and 20 kHz has been established as the lowest safe operating frequency for most commercial high intensity ultrasonic equipment.

For economic reasons, process equipment is usually designed to make, finish or otherwise convert materials of widths from 60 to 360 inches. Because of horn width limitations, ultrasonic applications in the continuous process industries require the use of as many as 25 to 150 separate systems. In addition, each ultrasonic transducer, horn and ultrasonic generator must be adjusted to give substantially the same performance with respect to the working horn's output vibration in an attempt to obtain uniform treatment of the materials over their width.

To expand the applicability of ultrasonic vibration, a slotted horn is disclosed in U.S. Pat. No. 3,113,225. By introducing vertical slots at regular intervals along the horn's width, Poisson coupling is interrupted but extensional motion is conserved. The slotted horn was therefore a major advance in horn design. However, the introduction of slots imposed a severe requirement of other portions of the horn. FIG. 7 illustrates a slotted horn attached to a booster 43. The slots are placed at regular intervals $\Gamma/6$ apart, giving an overall horn width of $7\Gamma/6$, or slightly more than one wavelength. The motion imposed at the booster connection 44 is purely extensional. Because the unslotted upper and lower regions of horn, shown crosshatched at 86, 87, are not perfectly rigid they do not communicate this motion faithfully to the other portions of the horn which are separated by the slots. Again, a tangential component of motion appears along the horn's edges as shown by arrows 45. The actual displacement of the horn is shown by envelopes for expansion 46 and contraction 47. Hence, although the slotted horn permits essentially extensional resonance to occur in horns having widths exceeding $\Gamma/2$, it does not provide a uniform output across the horn face. Variations in the extensional component of motion in such horns are commonly observed to be on the order of 100 percent.

Attempts have been made to improve the output uniformity of slotted horns. Holze U.S. Pat. No. 4,315,181 stiffened the upper parts of the horn by increasing the thickness of the unslotted portions. Elbert et al. U.S. Pat. No. 4,607,185 added half wavelength resonators to the upper surface of the horn near the ends to enforce extensional motion at a point where it is otherwise most degraded. Harris et al. U.S. Pat. No. 4,651,043 introduced skewed slots, or slots placed at an angle to the vertical axis of a horn with integral amplification. These slots change the amplification of motion in the horn along its width and therefore compensate for diminution of extension in the outboard regions. Welter U.S. Pat. No. 4,749,437 added masses to the upper surface of the horn to introduce inertial elements claimed to equalize output motion.

Despite these several modifications, it has been found impractical to build horns having substantially uniform output in widths greater than $\Gamma$. Consequently many industrial continuous process applications that could profit from the use of ultrasonic technology have found the investment in equipment to be prohibitively expensive and labor intensive in order to provide the process control apparatus which is necessary to ensure uniform station to station performance in an array. Mishiro U.S. Pat. No. 4,483,571 attempted to remove some of these obstacles to the use of ultrasonic processing by vibrating a solid bar with transducers attached at regular intervals along the bar's length. While this system does provide a single processing unit as opposed to an array, it does not provide uniform vibrational motion along the width of the bar, thus necessitating the use of at least two such systems, one offsetting the non-uniformity of the other, to ensure a mean uniform exposure to the processed material.

The principal problem encountered in extending the width of slotted horns, namely the finite flexural rigidity of the material above and below the slots, dooms the production of uniform extensional vibration beyond about $\Gamma$. Attempts to increase the flexural rigidity of the very sections that must continuously and faithfully transmit extensional motion introduces enough Poisson coupling in these thickened regions to again produce lateral motion. Thus, an extended width horn capable of providing uniform vibration over its width is provided by the preset invention to overcome the deficiencies of the prior art.

Such extended width horns would provide operational advantages in a wide variety of commercial processes, primarily in applications where material having an extended width must be subjected to ultrasonic vibration for a particular process purpose. Such advantages are obtained for processes which utilize the extended width horn in a stationary position over which the material would pass, or for situations when the extended width horn is moved across the surface of a material to be treated.

An example of a potential use for an extended width horn in a movable device is shown in U.S. Pat. No. 4,069,541, which discloses a liquid application and vacuum pickup cleaning apparatus utilizing ultrasonic vibration to agitate the cleaning solution. However, such extended width horns would be particularly useful in any continuous process for subjecting material to ultrasonic vibrations, including, for example, those processes described in U.S. Pat. Nos. 3,660,186, 4,044,174, 4,326,903, 4,605,454, 4,690,722, 4,713,132, 4,758,293, 4,770,730 and 4,823,783.

A major disadvantage as to the use of ultrasonic transducers for continuous processing relates to the removal of heat generated by the vibrating piezoelectric crystals. When crystals are mounted within two segments of material, as shown in FIGS. 1-3, the perimeter of the crystal must be exposed to the atmosphere in order to allow the air to cool the crystal. As such, the transducer is open to contact by moisture or fluid if used in a wet environment, with short circuiting or other damage to the crystal being possible.

A variation on the type of transducer of FIGS. 1-3 is known from U.S. Pat. No. 3,524,085. In this patent, the crystals are mounted at the end of the material to be vibrated, rather than at the center. This type transducer is preferred since it produces less heat for the same motional output compared to the transducer of FIGS. 1-3. Regarding the use of such a transducer in wet environments, the same problems mentioned above, although less severe, nevertheless apply. Thus, it would also be desirable to obtain a transducer which can be hermetically sealed or otherwise protected from moisture contacting the crystals while still retaining means for cooling the crystals.

SUMMARY OF THE INVENTION

The invention relates to a vibration apparatus comprising means for generating vibrations in a first direction, and a spine member having first and second ends and being operatively associated with the vibration generating means. The spine member is oriented perpendicular to the direction of the generated vibrations. Also included are a plurality of tine members each having a working end for transmitting the generated vibrations. Each tine member extends perpendicularly from the spine member in the direction of the generated vibrations, and is positioned and attached at an antinode location along the spine member. Each tine member should have a length of $n\Gamma/2$ wherein n is an integer and $\Gamma$ is equal to c/f where c is the velocity of sound in the apparatus and f is the chosen frequency of vibration. Also, the first and second tine members positioned on the spine member opposite the attachment of the vibration generation means are attached at their working end but are otherwise separated by a space extending along their length. Every other tine member is connected to adjacent tine members only at a points along their length of $n\Gamma/4$ wherein n is an odd integer. These other tine members form a symmetrical pattern on each side of a plane passing vertically between the first and second tine members.

The working end of each tine member other than the first and second tine is separated from the working end of each adjacent tine members. Also, the space between the first and second tine members is generally in the shape of a T. A first portion of adjacent tine members other than the first and second tine members is spaced by a T shaped slot, each slot having a length of about $n\Gamma/4$, while the T shaped space between the first and second tine members has a length of about $n\Gamma/2$. In this arrangement, the second portions of adjacent tine members are spaced by an elongated slot, with the first portion of the tine members being adjacent the spine member with the second portion of the tine members being adjacent to their working ends. Also, the working end of each tine member may also have a non-uniform shape, such as one of tapered, rounded, angled, or patterned, to impart other performance characteristics to the apparatus.

Preferably, the apparatus has a width of at least $1.2\Gamma$, such as at least 12 inches, for frequencies above 18 kHz. Also, each tine member has a width of less than one half of the flexual wavelength, and preferably less than 1.414 inches. The working end of each separated tine member, includes a longitudinal space extending at an angle to its width. To improve the efficiency of the generated vibrations, the first and second ends of the spine member, which each extend beyond the width of the outermost tine members, may be tapered. Furthermore, the length of each tine member may have a first cross sectional area adjacent the spine member and a second cross sectional area adjacent the working end, with the first cross-sectional area being greater than the second cross sectional area. Thus, the tine members would provide amplification to the generated vibrations.

In this apparatus, the generated vibrations have a uniformity of ±10% across the width of the apparatus. This is a significant improvement since the width of the apparatus is increased compared to prior art devices. Also, means for boosting the generated vibrations may be included, and such boosting means may be located between the vibration generating means and the spine member.

In another embodiment, each tine member may be positioned and attached at every other antinode location along the spine member so that each tine member vibrates in the same direction, thus forming a unitary working end for the apparatus. In this embodiment, each tine member is attached at its working end to each adjacent tine member but is separated therefrom by a slot extending substantially along its length. Again, the slot between adjacent tine members has the shape of a T.

In yet another embodiment, the apparatus includes a plurality of half wavelength extensional resonators mounted symmetrically on the spine member. A plurality of the members are attached to the spine member with the space between each tine member having a T shape. In one version of this embodiment, an odd number of resonators is utilized and the vibration generating means is associated with the even numbered resonators. It is also possible to utilize an odd number of resonators wherein the vibration generating means is associated with the odd numbered resonators. Thus, the T shaped space between tine members opposite the resonators associated with the vibration means is of a longer length than the T shaped space between other tine members. Also, the working end of the other tine members is separated from that of adjacent tine members as described above.

The term "associated" used in connection with the relationship between the vibration generating means and the resonators refers to whether or not the resonators are vibrated. In the preferred embodiments, the vibration generating means associated with a resonator would be a separate ultrasonic transducer mounted upon the resonator.

It is also possible, but less preferable, to utilize an even number of transducers wherein the vibration generating means is associated with a predetermined number of resonators. A preferred arrangement is obtained when the vibration generating means is associated with each resonator. Also, the spine member may have a smaller thickness than it has in the other embodiments by connecting the tines at every other antinode. In this version, each T shaped space between adjacent tine members has substantially the same length. One skilled in the art can select the optimal arrangement of transducers and resonators for the particular application or end use of the device.

Another aspect of the invention relates to a vibration generating apparatus comprising a plurality of piezoelectric crystals in adjacent spatial relation, means for energizing the crystals in a manner which causes vibration thereof a support for transmitting vibrations generated by the crystals, means for mechanically coupling the crystals to the support, and means for removing heat caused by vibration of the crystals.

The plurality of crystals comprises a number of pairs of stacked piezoelectric disks with means disposed between each pair of stacked disks for providing an electrical connection to one side of each disk. Preferably, two pair of stacked disks are utilized and the electrical connection means comprises a metallic electrode. Each of these stacked disks includes a central aperture and the mechanical coupling means comprises an elongated member having a head portion of a cross-section which is larger than that of the disk apertures, a body portion capable of passing through the disk apertures, and a forward end for attachment to the support, thus fastening the disks thereto.

The heat removing means may be an enclosure mounted upon the support and positioned about the crystals, which includes a heat transfer medium contained therewithin. The most preferred heat transfer medium is boron nitride powder, and the enclosure may include a plurality of fin members for dissipating heat. Also, the enclosure may include a jacket for forming a sealed fluid passage for cooling the powder. If desired, a cooling coil within the enclosure may also be used, although such a construction is not preferred. These enclosures are mounted upon the support at a node to provide a hermetic seal which prevents moisture from contacting the crystals, thus allowing this vibration generation means to be utilized in wet or moist environments.

The invention also relates to a cleaning apparatus comprising one of the vibration generating apparatus described above, means for dispensing a cleaning solution adjacent a first side of the vibration generating apparatus toward an item to be cleaned, and means for removing the cleaning solution from the item to be cleaned. The removing means is located adjacent a second the of the vibration generating apparatus and the cleaning solution is dispensed upon the item prior to contact by the vibration generating apparatus and then is removed from the item after contact by the vibration generating apparatus. Preferably, the dispensing means is a nozzle and the removing means includes a vacuum source.

The invention also discloses a number of methods for using these vibration generating devices. Thus, a method for subjecting at least one material having a width of at least about 12 inches to ultrasonic vibrations comprises constructing a unitary vibration generating apparatus having a width which is substantially the same as the material to be treated, generating vibrations from the vibration generating apparatus which do not vary by more than ±10% across the width, and passing the material between the vibration generating apparatus and a support member to subject a portion of the material to the ultrasonic vibrations.

The material may comprise two separate sheet materials which can be at least partially bonded together. Also, the support member may be a rotating element and at least a portion of the material can be compressed between the rotating element and vibration generating apparatus.

When the material comprises two separate thermoplastic sheets, the method further comprises at least partially laminating these sheet materials together. Also, one of the rotating element or vibration generating apparatus may include a pattern which is imparted to the laminate.

The method is also useful wherein the material is discontinuous, and it further comprises forming the material as an integral sheet by passing the vibrations through the discontinuous material. In addition, the method may be used to cut the material in one or more locations as the material passes between or along the vibration generation apparatus and support member.

When the material includes a mixture of solid and liquid components, this method may include separating the liquid component from the solid component as the material passes between the vibration generation apparatus and the support member. The support member may be spaced by a predetermined distance from the material, and vacuum may be applied to the support to assist in the separation of the liquid component from the solid component.

In the situation where the material is a plurality of fibers, the method may further comprise conveying the fibers to the vibration generating apparatus and forming a fabric as the fibers pass between the vibration generating apparatus and support member. Also, a pattern may be imparted into the fabric, if desired.

Another method includes constructing the support member as a rotating element in combination with means for scraping the material from the rotating element. Thus, the method may further comprise atomizing the material into particles as it passes by the rotating element, scraping means and vibration generating apparatus.

When the material is a metal sheet, the method may include finishing the metal sheet to a final dimension and condition. This finishing step may include one or more of rolling, grinding, deburring, machining or cleaning the material. In some situations, the material may be a particulate solid of metal or otherwise, and the method further comprises compacting the particulate solid as it passes between or along the vibration generating apparatus and support member.

The method of joining two sheets of material as they pass between the vibration generating apparatus and support member can also be achieved by this method. These sheets may be welded or soldered together by passing between the vibration generating apparatus and support member.

Another aspect to the method relates to cleaning the material as it passes between the vibration generating apparatus and support member. A liquid may be applied to the material before or as it passes between said vibration generating apparatus and support member, and the applied liquid may be removed as or after the material passes between the vibration generating apparatus and support member.

BRIEF DESCRIPTION OF THE DRAWINGS

A better understanding of the invention and its distinguishing features over prior devices can be found in this specification by reference to the accompanying drawing figures, wherein:

FIG. 9 is a front view of an ultrasonic horn in accordance with the teachings of the invention;

FIG. 10 is a side view of the horn of FIG. 9;

FIG. 11 is a bottom view of the horn of FIG. 9;

FIG. 12 is a perspective view of another ultrasonic horn according to the invention;

FIG. 13 is an exploded view of the piezoelectric crystals which drive the ultrasonic horn of FIG. 12;

FIG. 14 is a front view of an extended width ultrasonic horn according to the invention which includes both operational and idle resonators;

FIG. 15 is a front view of an extended width ultrasonic horn according to the invention using dual operational resonators;

FIG. 16 is a front view of an extended width ultrasonic horn according to the invention where the tines are attached at every other spine antinode;

FIG. 17 is a side view of the horn of FIG. 16;

FIG. 18 is a bottom view of the horn of FIG. 16;

FIG. 19 is a view, partially in cross section, of a preferred piezoelectric crystal configuration for the transducers associated with the operational resonators of the invention;

FIG. 20 is a view, partially in cross section, of a fluid cooled housing for the piezoelectric crystal configuration of FIG. 19;

FIG. 21 is a top view of the housing of FIG. 20;

FIG. 22 is a side view of the housing of FIG. 20;

FIG. 23 is a view, partially in cross section, of an air cooled housing for the crystal configuration of FIG. 19;

FIG. 24 is a side view of the housing of FIG. 23;

FIG. 25 is a side view of the housing of FIG. 23;

DETAILED DESCRIPTION OF THE PREFERRED EMBODIMENTS

The present invention achieves an ultrasonic horn which can generate uniform vibrations over a width of $\Gamma$ or greater. The horns of the invention are useful over a frequency range of between 10 and 50 kHz, although ultrasonic frequencies of above 18 to 40 kHz are preferred. Thus, at the most preferred frequency of 20 kHz, the width of the device can be 10" or greater, with 12 or up to 16" or more easily being achieved in a device which is suitable for continuous operation.

Rozenberg, Sources of High Intensity Ultrasound, Vol. 2, 1969, pp. 111–114 reveals the theoretical use of flexural resonators to transmit the extensional motion produced by a transducer to horns attached at specific points on the flexing bar. The present invention extends and refines this concept to excite an array of horns, each adjacent to the other, such that the motion produced by each horn has the identical amplitude.

Figure 1:
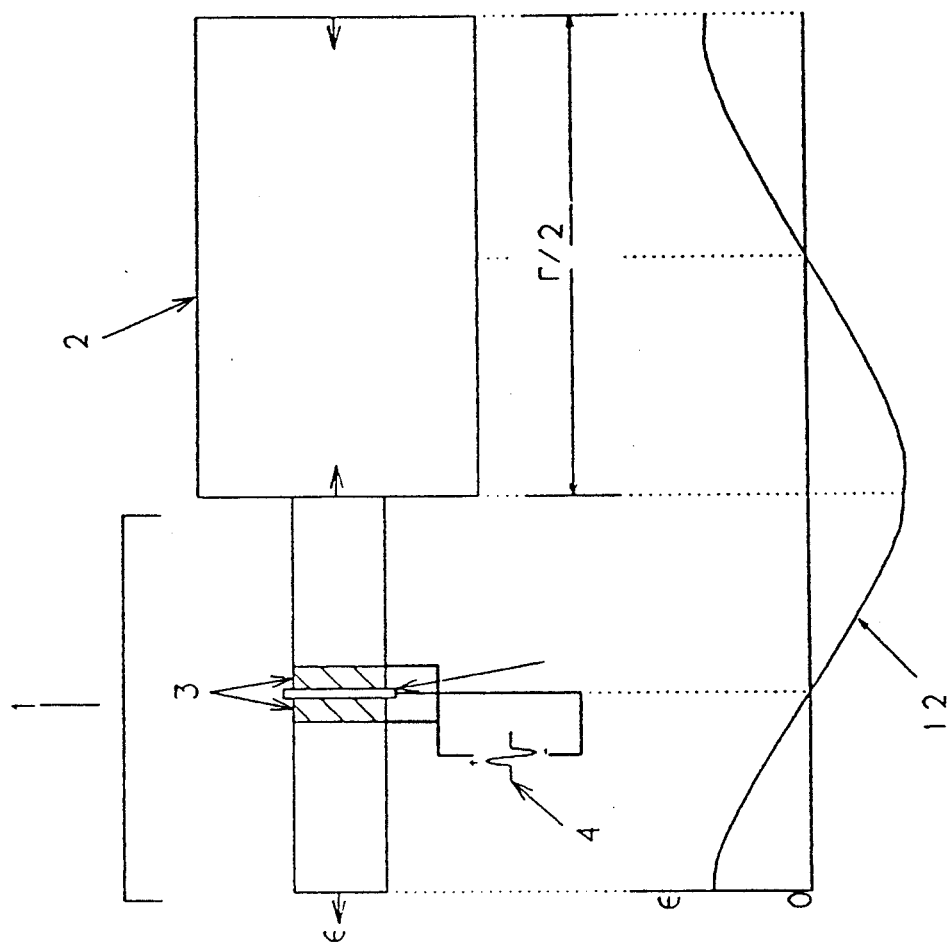
FIG. 1 is a schematic illustration of a conventional ultrasonic transducer and the variation of extension produced along the length of the device.
Figure 2:
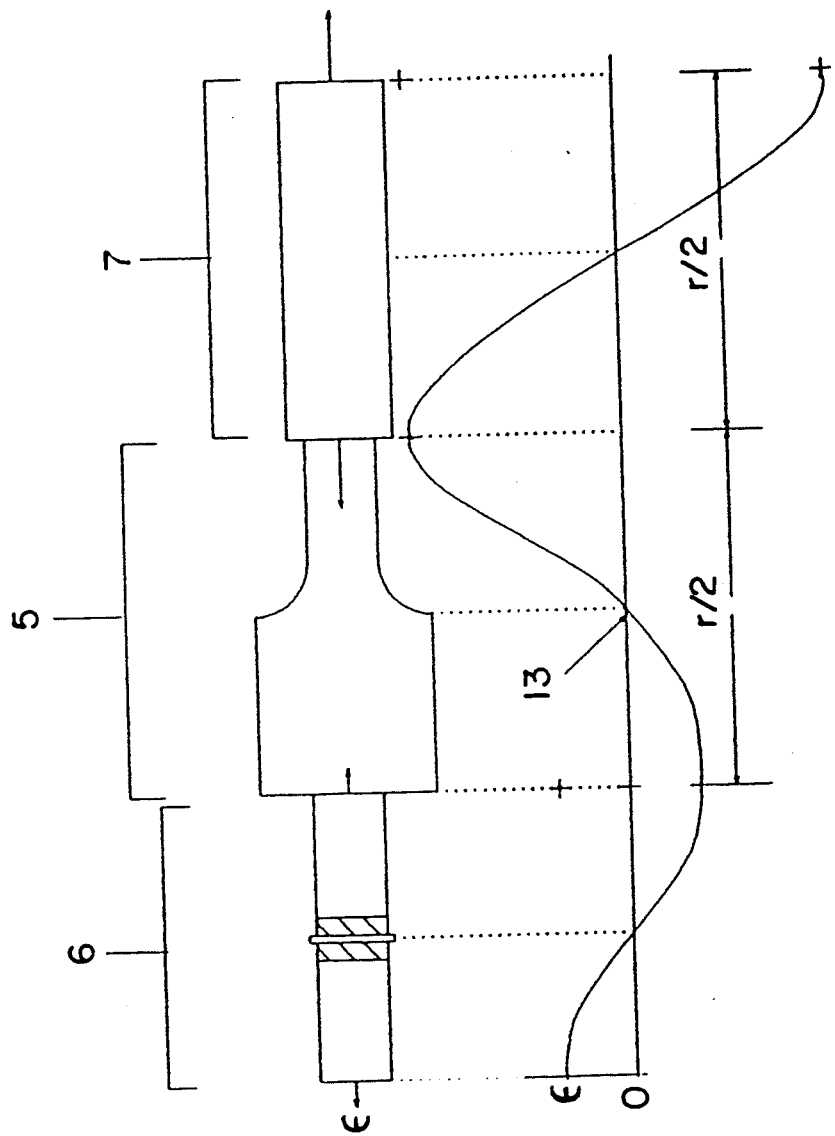
FIG. 2 is a schematic illustration of a conventional transducer and booster assembly also illustrating the variation of extension produced along the length of the device.
Figure 3:
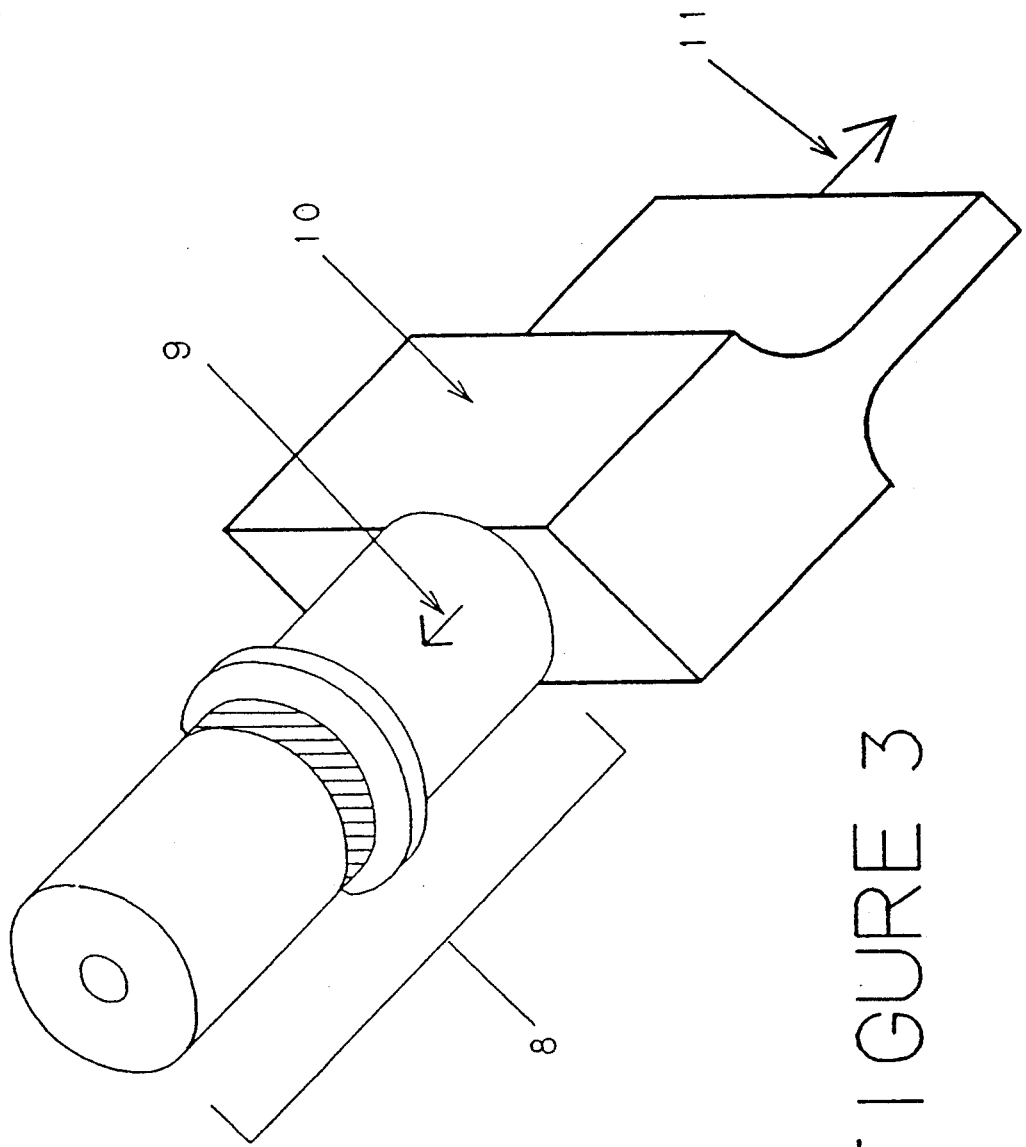
FIG. 3 is a perspective view of an ultrasonic transducer assembly which includes a stepped working horn.
Figure 6:
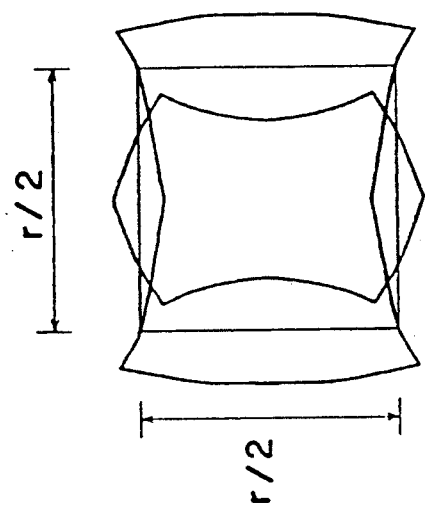
FIGS. 4-6 are schematic illustrations of solid rectangular structures which are subjected to vibrational stress.
Figure 5:
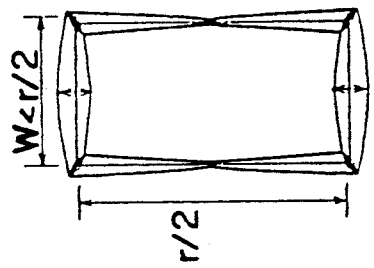
Figure 4:
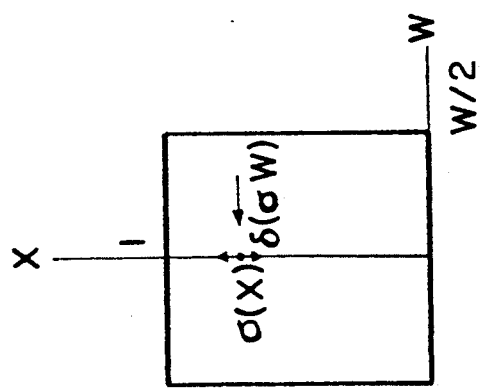
Figure 7:
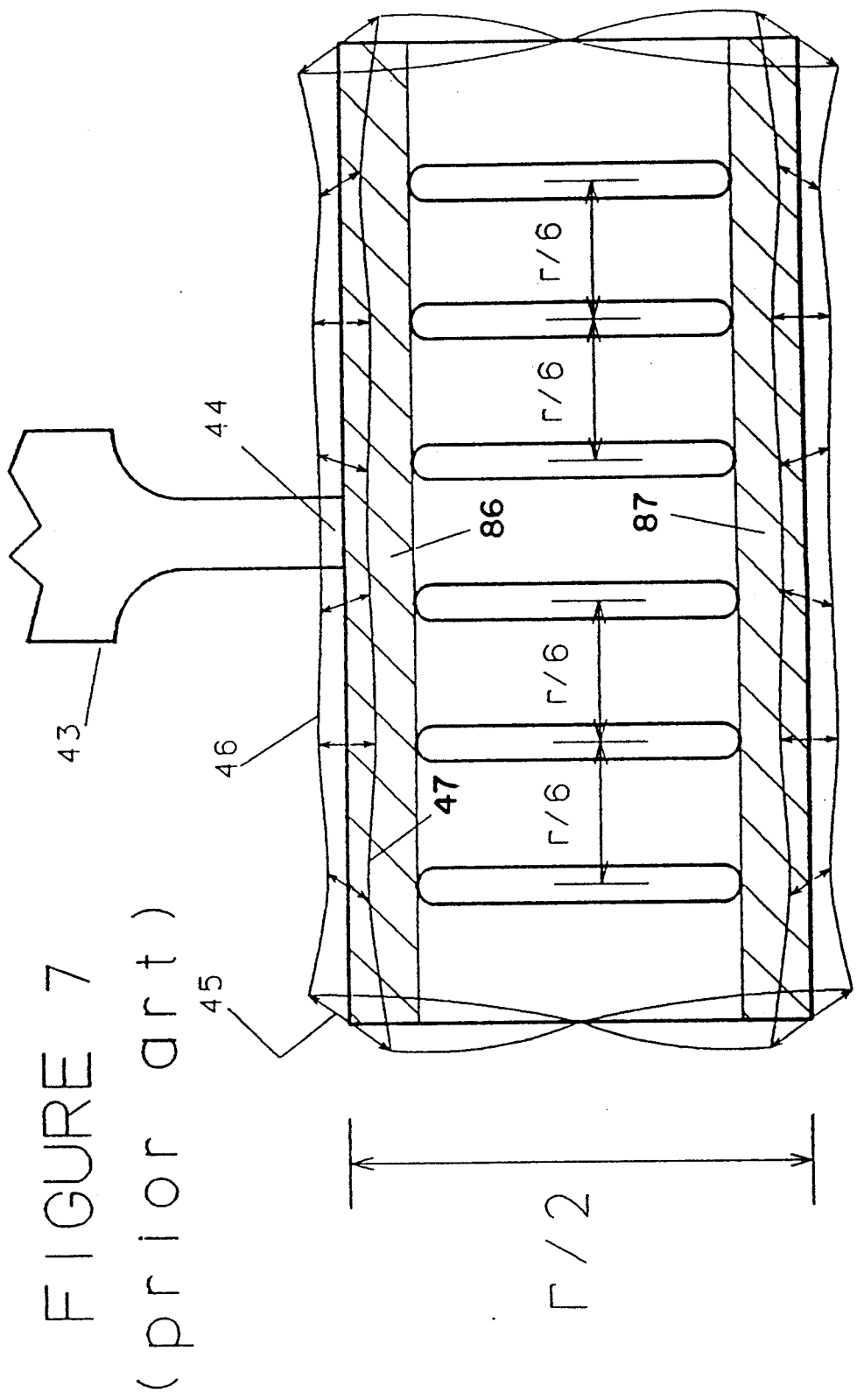
FIG. 7 is an illustration of a conventional ultrasonic horn.
Figure 8:
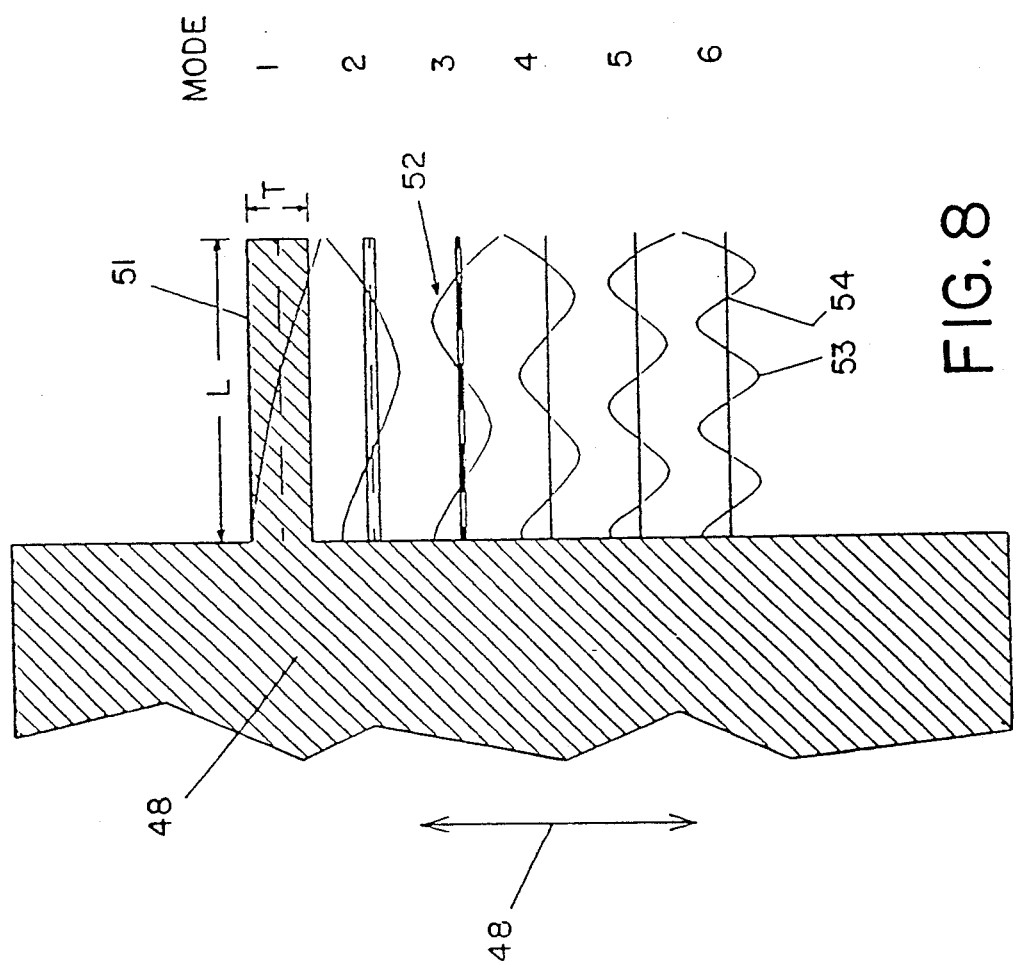
FIG. 8 is a schematic illustration of various modes of flexural resonance for beams of different thicknesses.

FIG. 8 shows a large mass 48 supporting cantilevered beams 51, each of the same length L but of different thickness T. If this mass is caused to oscillate up and down in the plane of the page as shown 49, a frequency of oscillation will be found where the beams execute the motion shown by curves 52. This deformation is produced by standing waves whose wavelength, $\Gamma_f$, bears a direct relation to beam's length, L. $\Gamma_f$ is also a function of the beam thickness. Consequently, beams of different thickness will execute different motions when excited at the same frequency. Conversely, for a given beam thickness and length, there are specific frequencies where each of the deformation patterns shown in FIG. 8 can be obtained. Each of these patterns is a mode.

FIG. 8 illustrates the first six modes of flexural resonance in a cantilevered beam driven by oscillation at its attachment. All modes are characterized by at least one point of no motion 54, termed a flexural node, and, except for the first mode, at least one point of maximum motion 53 where the slope of the deflection is zero, termed a flexural antinode. The vibrational motion at the antinodes is perpendicular to the beam. If a working horn is attached to the beam at any of these points, and its resonant frequency equal to that of the beam, this flexural motion will excite extensional vibration in the horn, acting exactly as does a booster or transducer at its point of attachment in conventional systems.

FIGS. 9–11 illustrates how the flexural resonance of a bar can be used to equitably distribute excitation to an array of extensionally resonant horns. Here the beam 56 is an integral part of the booster 55. In practice the beam is fabricated as a separate part and attached by a bolt 67 to the booster. The booster and the portion of the beam in direct contact with the booster form an extensionally resonant structure. The two portions of the beam whose surfaces are not in contact with the booster form flexural resonators called a spine member or spine 56. The thickness, T, and length, L, of these spines are adjusted so that they resonate in a given mode at the same frequency as the booster with the beam portion attachment. The spine deformation shown 58 is the fifth flexural mode disclosed in FIG. 8. Here $\Gamma_f/2$ represents half a fifth mode flexural wavelength in the spine, and is substantially equal to the distance between nodes and antinodes.

Except for the center section of the structure, extensional horns, also resonant at the same frequency, are attached to the spine at each antinode 59. These horns 60 are called tine members or tines in this specification. Each is one half wave of a first mode extensional wavelength, $\Gamma_1$, in length. The center two tines are not driven by the spine, but directly from the booster and beam portion. Because the motion of adjacent antinodes is opposite 61, the tines cannot be joined at their output face, nor anywhere else except at their own nodes. To ensure complete exposure of subject material to vibration at the horn's output face, while maintaining separation of the tines, diagonal slits 62 are made through the material joining the tines and into the separating slot 90. The slits can be made very small, on the order of 0.02 inches. Because the motion of the two center tines is in the same direction, these tines, and only these tines are joined at the output face, 67. Preferably, the width of these tines is less than one half the flexural wavelength ($\Gamma_f$) of the system (typically about 2 inches), and more specifically, less than 1.414 inches. The most advantageous tine width is about 1 to 1.2 inches. These dimensions reduce lateral motion due to vibration across the width of the tines to a value which does not affect transmission of vibrations along the length of the tines.

The tines are thus suspended from the spine, but, as previously mentioned, with the exception of the two center tines, they can be joined at their motional nodes 63. This attachment is possible because the Poisson induced lateral contraction (dilation) of one tine is exactly in the direction of the lateral dilation (contraction) of the adjacent tine. Such joints have important practical utility in serving to make the overall structure sufficiently rigid to withstand, without appreciable deflection. the forces imposed upon the output face during continuous processing. Because the motion of the center tines is identical, a nodal attachment cannot be made, but, as discussed, it is permissible to join these two horns at their output face.

The motional pattern of the horn is shown 64 reversing direction at every horn, except for the center region. This reversal in motion has no effect upon ultrasonic processes, such as drying, welding, atomizing or cleaning, where the important characteristic of the vibration is the uniformity of the root mean square value of vibration, which is shown as a line 65. The curves shown in the profile view of the horn depict the extension of the booster 75 and of two adjacent tines 76, 77. The comb horn of FIGS. 9-11 has no amplification.

The extent to which the flexurally resonant spine exhibits antinodes whose vibrational amplitude is substantially the same can be mathematically evaluated from the theory of flexural resonance in thin beams (see, e.g., Rayleigh, Theory of Sound, 1894, reprinted 1945, Vol. 1, pp. 255-305). The solution to the wave equation for flexural vibration can be written as:

$$\Omega = A \sin h(\phi a) + B \cos h(\phi a) + C \sin (\phi a) + D \cos (\phi a) \quad (1)$$

where A, B, C, and D are constants and X is the amplitude. Sin h and Cos h are the hyperbolic sine and cosine functions and $\alpha = x/L$, where x is the coordinate of spine length. $\phi$ is defined as:

$$\phi = \beta L/E \quad (2)$$

where $\beta = 2\pi f$, f being the frequency of vibration, L is the spine length and $E = \sqrt{(\beta cT)}$ where c is the sound velocity of extensional waves in the spine material and T is the radius of gyration of the spine's cross sectional area about the neutral axis of deflection. For spines having constant rectangular cross sectional area, $T = T/\sqrt{12}$.

The constants A, B, C, and D are determined from the boundary conditions to which the spine is subject at its extremities. Of interest here are two different operating conditions: (1) the spine cantilevered by a vibrating support and free at its opposite end and (2) the spine cantilevered off a vibrating support at both ends. In the first situation, where the spine is cantilevered, the spine must be perpendicular to the support where it is joined and the shearing force must also vanish at this point. These conditions can be stated mathematically be placing the first and second derivatives of $\Omega$ with respect to x, evaluated at x=0, equal to 0. The free condition at x=L is equivalent to specifying that there be no bending moment or shearing force in the spine at this point. These conditions can be mathematically phrased by equating to zero both the second and third derivatives of $\Omega$ at x=L. When these constraints are imposed on equation (1), there results an equation which relates the frequency, f, spine length, L, and the radius of gyration, T:

$$\text{Tan } (\phi) = -\text{Tan } h(\phi) \quad (3)$$

Solutions of equation (3) for $\phi$ yield a set of unique relations between the spine thickness, T, length, L, and vibration frequency for each mode. These values of $\phi$ can be obtained to any precision by numerical methods, but of particular interest to this invention is the antinode to antinode amplitude, in any mode, along the vibrating spine. It can be shown that if $\epsilon$ is the amplitude of spine at its point of attachment, successive antinodes also have an amplitude $\epsilon$ with the exception of the last, whose amplitude is $0.935\epsilon$ or 6.5 percent less than the others. The very end of the spine is not an antinode, since the first derivative of $\Omega$ does not vanish at this point. For all modes the amplitude at the end is $(\sqrt{2})\epsilon$ or approximately 41 percent greater than the antinode amplitudes. Obviously, because of the deflection's slope and amplitude, a tine attachment at this point is not advisable.

For the situation where the spine is cantilevered to vibrating supports at both ends, and where the vibration at the supports has the same amplitude and direction, the equation specifying $\phi$ is particularly simple:

$$\cos (\phi) = \pm 1$$

The solutions of this equation are therefore:

$$\phi = n\pi \quad (4)$$

where $\pi = 0, 1, 2, \ldots$

For this situation, the antinodes all have the same amplitude, $\epsilon$ and the deformation takes the simple form:

$$\Omega = \epsilon \cos (\phi a) \quad (5)$$

For the structure shown in FIG. 9, spine dimensions L and T are determined by equation (3). Therefore the tines attached to the last antinodes of the spine have an amplitude some 6.5 percent less than the others. In the interest of providing a uniform vibration amplitude over the entire width of the horn, this diminution at the ends may be remedied by taperinq the spine near its free end. FIG. 12 illustrates this modification. By reducing the mass of the spine at this point 66, the amplitude of last antinode is increased and can be made equal to the others.

FIGS. 12-13 also illustrate the use of tines with amplification, obtained by a reduction in their cross sectional area in the region of their extensional node 91. The spine 68 is driven by transducer 93 which contains two piezoelectric crystals 69, 70 sandwiched between and electrode 72. The crystals are driven by an alternating current voltage source as shown. In this horn again the tines are joined together at their nodes 71 and saw slits 72 in the output face maintain separation of adjacent tines while ensuring uniform exposure of vibration to processed media. The two center tines are not joined at their nodes 73, but because they move in the same direction they can be attached at their output face 74. The curve 75 depicts the deflection of the spine for this particular comb horn.

In addition to the stepped configuration shown in FIGS. 12-13, other non-uniform tine cross sections may be used to amplify vibrations. A cross section which varies along the length of the tine according to the equation $$\text{Area} = Ae^{-aL}$$

where e is the natural base, A and a are constants and L is the length of the tine, can theoretically provide an amplification for this function in the ratio of the square root of the starting and finishing cross-sectional areas. Amplifications of between 1 and 2 can be obtained by configuring the tine member to have constant stress along its length. Thus, the cross section would obey the relation $$Area = Be^{-by^2}$$

where B and b are constants and y is the distance from a given point to the working end of the tine. This mathematical function is known as the Gaussian function. These and other methods for obtaining constant stress along the length of a vibrating device are disclosed in U.S. Pat. No. 4,750,488. Any of these configurations would be suitable for the configuration of the tines of the present invention.

The spine and tines of the apparatus are preferably made of a metal such as aluminum or titanium. The apparatus is machined from a solid block of such material in a manner which is known by one skilled in that art.

FIG. 14 illustrates a comb horn in which the analysis summarized by equations (3) and (4) both apply. This structure is driven by two transducers 78, 79 and companion boosters 84, 85, since a horn of this width may require more power than can be provided by single source. The crystals of each transducer are driven by a common voltage source such that both transducers execute the same motion. In addition an idle or dummy extensional resonator 80 has been added in the center of the spine 81. Spine deflection is shown by the superimposed curve 82. The sections of the spine between the transducers 78, 79 and the idle resonator 80 are governed by equation (4). In these regions the antinodes are everywhere equal and tine output amplitude is identical. The sections of the spine to the right and left are governed by equation (3), and so have been tapered at their ends to compensate for the diminution in vibration that would otherwise be encountered.

The idle resonator may be replaced by a transducer and booster, identical to those on its right and left, if the power requirement for a process mandated the use of three sources. Any number of transducers and boosters may be used. For example, FIG. 15 illustrates dual transducers (178, 179) and boosters (184, 185) upon spine 181 wherein tines are attached at each antinode of the vibration wave 182. Again, the ends of the spine 183A, 183B are tapered.

For applications requiring a wide horn with modest power usage, however, the idle resonator of FIG. 14 serves to allow the use of a spine having a thickness, T, which is greater than it would be if only the two operational transducers were employed. To utilize only operational transducers, as shown in FIG. 15, while preserving horn width, the spine's mode of vibration has to be raised, an accomplishment that can only be attained, for any given frequency, by reducing its thickness and thus its static strength in the face of processing forces imposed upon the face of the horn. Although useful horns can be produced, for the same width spine, the overall length of the horn is somewhat shorter than for horns which include idle transducers.

The comb horn, like any other ultrasonic horn, must be mounted into the machinery frame so that the requisite force may be applied to the output face of the horn and thereby on the media being processed. The nodal regions of the boosters are normally used for this purpose, since in that part of their structure there is little ultrasonic motion. This method is also the preferred arrangement for holding and applying force to the comb horn. In very wide horns, such as that shown in FIG. 14, the motional node on the dummy resonator 80 also serves as an intermediate point of support, resisting deflection that might otherwise occur in the center of the horn and thereby ensuring a uniform distribution of contact pressure with the subject media.

It is also possible to attach the tines 210 in a comb horn 200 to every other spine antinode 205, as shown in FIGS. 16-18. In such a design, every tine vibrates in the same direction, precluding joints at their nodes. However, because the output motion is everywhere the same, the tines may be integrally attached at the horn face 215 and each T shaped slot 225 between adjacent tines would have essentially the same length and configuration. Although use of alternate antinodes does permit a continuous output surface uninterrupted by diagonal saw slits, for any comb horn of given width and spine thickness, the tines 210, since they must span two antinodes, are necessarily of greater width than are those in a comb horn using attachments at every antinode. As a result, Poisson coupled lateral motion will be greater is such a structure and the likelihood of a lateral component in the motion of the tines is therefore increased.

Resonator 230 is attached to spine 235 at threaded stud 240. Resonator 230 is provided with an aperture having mating threads for reception of stud 240. It will also be appreciated that, for this embodiment, the thickness T of spine 235 is approximately ¼ of the thickness of the spine 68 of the apparatus of FIGS. 12-13. Since the value of $\phi$ in equation (2) is doubled, the thickness T for spine 235 must be quartered.

Furthermore, it is observed that the operation of the comb horns of the invention are not specific to any particular transducer, although sandwich type piezoelectric designs are shown in FIGS. 1-3 and 12-18. Other piezoelectric transducers using tubular crystals, or stacks of cylindrical crystals as well as magnetostrictive transducers may be used as motive sources for powering the horn. The horn may also be excited by an ultrasonic transmission line, consisting of multiple wavelength rods or tubes connected remotely to the transducers.

FIGS. 19-25 illustrate a preferred piezoelectric crystal assembly 300 for the transducers of the invention, along with two variations for cooling such crystals.

In each embodiment, boron nitride powder 311 is used to fill the space around the crystals 306. Since the crystals are porous, liquid coolants such as glycols in contact with the crystals are not preferred, because they may cause cracking of the crystals during extended operation over time. Suitable boron nitride powders are available from Duramic Products, Inc., Palisades Park, N.J. in a variety of mesh sizes which can be used depending upon the specific size of the device. These powders are preferred because they are not electrically conductive, but have a natural lubricity and a thermal conductivity on the order of copper. Thus, the crystals 306 and powder 311 may be hermetically sealed inside enclosure 325 so that the horns of the invention can be successfully used in wet or moist environments.

FIGS. 19, 20 and 23 illustrate the stacking of four disks of piezoelectric crystals 306 with a metal electrode 326 positioned between each disk. Alternate electrodes 326 are connected to different polarity as shown to provide electrical excitation across the planar surfaces of the disks. The electrical connections terminate at ports 308A and 308B for further connection to a suitable power source. The assembly is held under compression by a central bolt 304 and washer 307 which are connected to support 330. The support is also provided with a shoulder 335, to which an outer housing may be attached at a nodal location where minimal vibration is present.

FIGS. 20-22 illustrate an enclosure 325 which is attached to support 330 at shoulder 325. O-rings 303 are utilized to further isolate enclosure 325 from vibration. Enclosure 325 is provided with a plurality of channels 312 on its exterior surface. In addition, jacket 310 is provided about enclosure 325 to form a boundary for channels 312. Jacket 310 and enclosure 325 are connected by the use of pins 302, and O-rings 301 are included for providing a seal which retains fluids therein. A suitable cooling fluid, such as water or a glycol, can be introduced at port 305A, and passes through channels 312 and interconnection 313 in contact with the outer surface of enclosure 325 to remove heat therefrom. The enclosure in turn removes heat from powder 311, which in turn removes heat from vibrating crystals 306. These channels 312 also pass over the top of enclosure 325 for maximum cooling effect.

FIGS. 23-25 illustrate an air cooled housing 345, which is configured in a manner similar to enclosure 325 of FIGS. 20-22. This housing 345 is mounted upon support 330 at shoulder 335, and is assembled by pins 302. Housing 345 includes a plurality of fins 348 on its side and top surfaces for dissipating heat.

Instead of these embodiments, it is also possible to utilize a smooth outer housing to surround the powder. In this version, a metal cooling coil (not shown), containing a cooling medium such water, can be placed in the powder and around or adjacent the crystals, with the powder again used as a heat transfer medium between the crystals and the coil.

The principles underlying this invention can be applied to a horn of any width, employing only as many transducers, singly or in combination, as are necessary to perform the intended function. Further, the output face vibration amplitude may be adjusted through either (1) the use of boosters attached to the transducer and horn or (2) by incorporating amplification into the horn itself. As such, this horn is capable of replacing the several or many separate ultrasonic systems now required in continuous processes. Furthermore, unlike an array of separate ultrasonic stations, this invention provides an exactly uniform output vibration that is adjustable from a single power source operated by a single set of controls.

A wide variety of processes can be conducted with the ultrasonic comb horns of this invention. As noted above, the greatest advantage for the devices of the invention is for use in processes which must treat materials having extended widths. The horns of the present invention can be prepared in any width for such applications, to cover widths to be treated of between 60 to 360 inches or greater. In addition, the working end of the horn can be provided with any of a wide variety of shapes, including flat, rounded, patterns, ridges, angles, etc. for achieving the intended treatment of the material. When angled working ends are provided, any angle can be used, although certain angles or tapers of 30, 45 or 60 degrees (or 90° multiples thereof) are generally advantageous.

Figure 26:
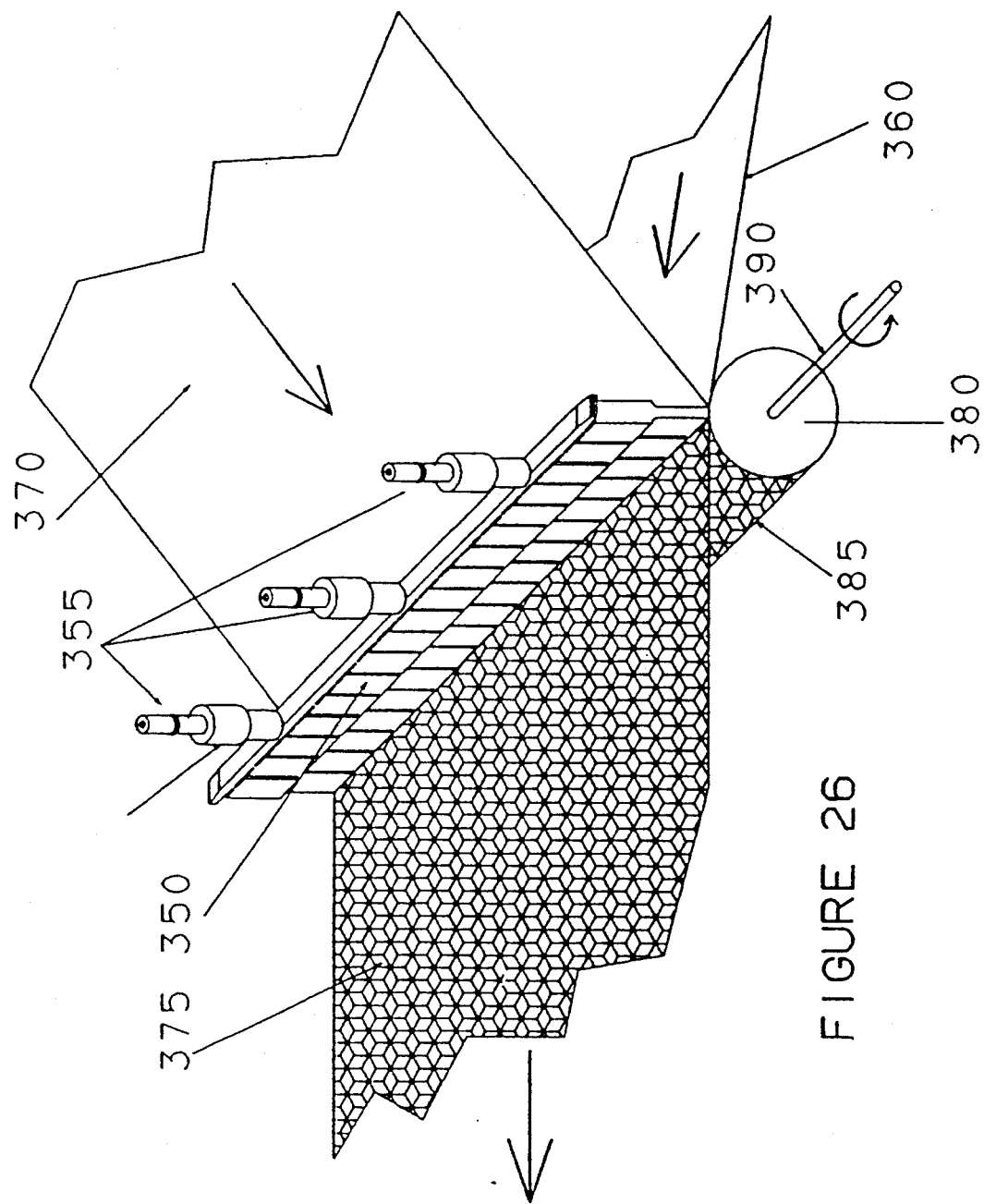
FIG. 26 is a perspective view of an apparatus for forming a fabric from raw fibers using an ultrasonic horn according to the invention.

FIG. 26 illustrates the use of the horn 350 similar to that of FIG. 15 except that it includes three ultrasonic transducers 355 and is used to laminate and emboss two separate thermoplastic films 360 and 370. These films, which may be of the same or different materials such as polyester and polyethylene, are sandwiched together between the array of working horns and a rotating drum 380 revolving about axis 390 in the direction shown. The working surface of the horn overlap due to the diagonal slits described above to ensure complete exposure of the films to vibration. The drum surface may bear a pattern 385 which is engraved or machined upon its surface. As the sandwiched films are drawn under the horn 350, the ultrasonic vibration welds them together where the raised surface of the drum enforces their intimate contact with the working face of the horn. The resulting laminate 375 that emerges is not only a physically integral combination of the two parent films, but also bears the drum pattern. Such composite films have found a variety of uses in such consumer products as handbag linings and mattress covers and in institutional products such as hospital drapes and gowns.

Another application for the apparatus shown in FIG. 26 is the actual formation of a fabric from raw thermoplastic fibers. In this scheme, the fibers are laid down as a gauze which is conveyed by an air current to the drum anvil whose surface is corrugated or otherwise patterned. Where the raised portion of the pattern forces the gauze into contact with the horn, the fibers are welded together. If the pattern is sufficiently fine, these welds effectively bind the gauze into a fabric suitable for linings and other secondary uses in garments.

Figure 27:
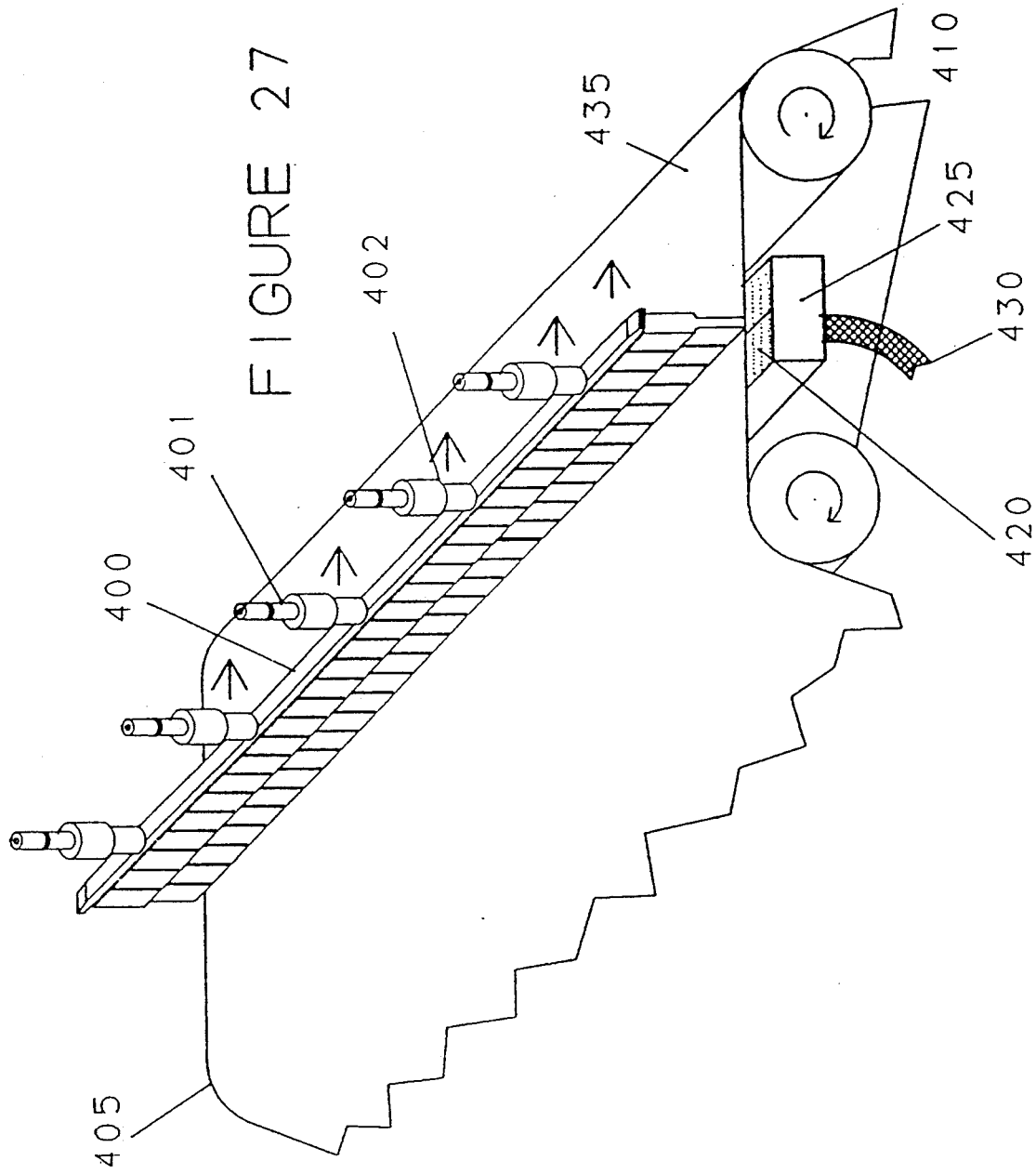
FIG. 27 is a perspective view of an apparatus for drying a fluid laden web which includes an ultrasonic horn according to the invention.

FIG. 27 illustrates another continuous process that exploits the ability of the invention to produce ultrasonic vibration over an extended width to dry fluid or liquid laden films or webs such as photographic emulsions, textiles or paper. Because ultrasonic drying utilizes mechanical effects to expel fluids, it uses far less energy than does thermal methods for accomplishing the same purpose. The web of material 405 to be dried is supported between rollers 410 which serve to maintain contact between the web 405 and the horn 400, shown with five transducers 401 and resonators 402. As the material passes under the horn 400, fluid is expelled from the lower surface 420 of the web into trough 425 which collects the effluent and conveys it to conduit 430 for removal. The conduit 430 may also be connected to a source of vacuum (not shown) to increase the rate of water removal. The dried web or film 425 is then transported to other machinery in the finishing processes.

Figure 28:
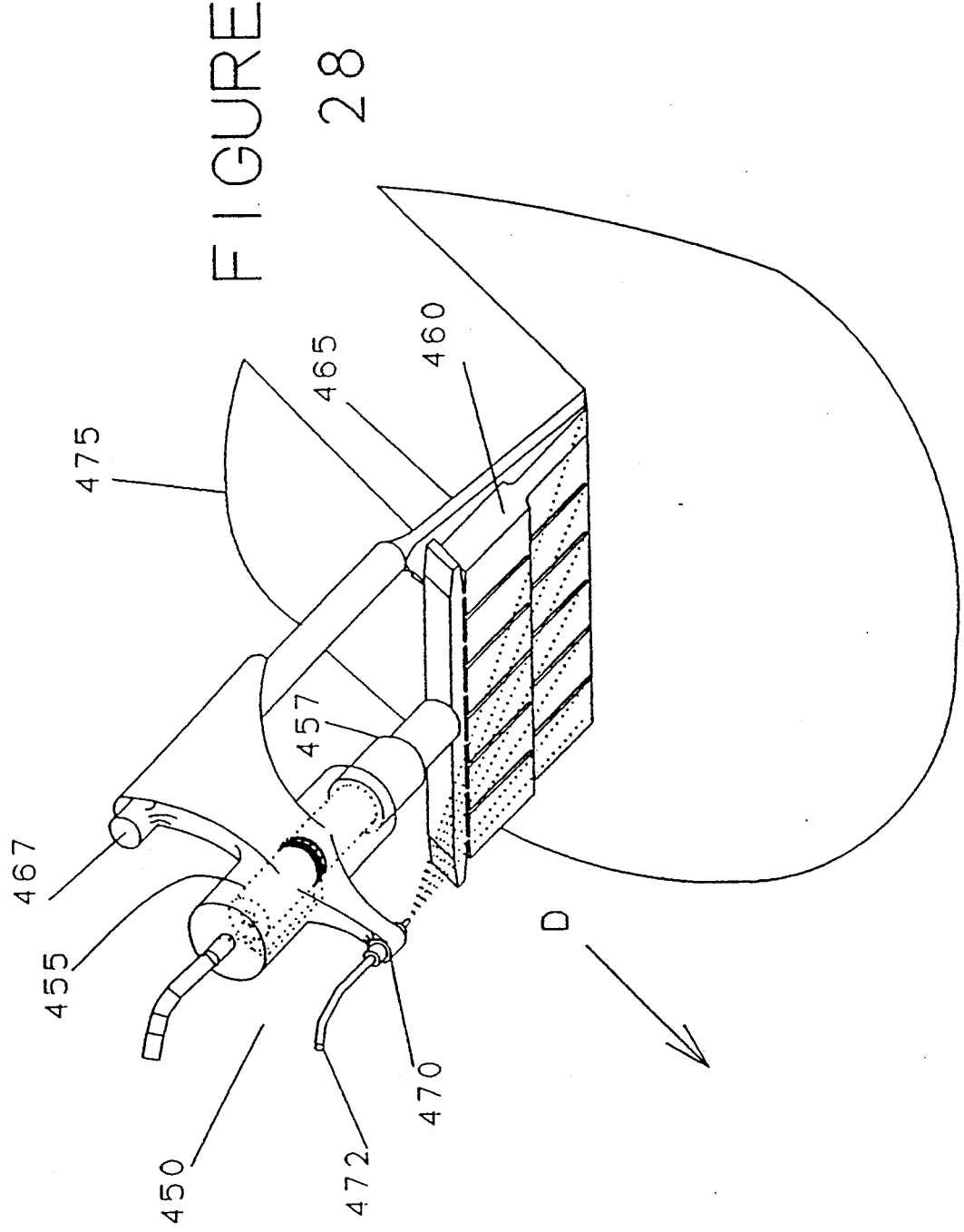
FIG. 28 is a perspective view of an ultrasonic cleaning device according to the invention.

FIG. 28 shows another application for continuous ultrasonic processing. Here an ultrasonic system 450 comprising transducer 455, resonator 457 and horn 460 are applied in combination with the administration of a detergent and vacuum to clean materials such as carpets, wall coverings, upholstery and even clothes. The ultrasonic system 450 is attached to a vacuum wand 465 and detergent nozzle or jet 470. The detergent enters the jet via hose 472. Vacuum 467 is applied to the wand 465. The whole assembly is drawn across the soiled material 475 in the direction D shown. Thus, the material is first wet, then sonicated by the ultrasonic horn whose working face velocity is sufficient to cavitate the detergent solution and thereby dislodge embedded solid and finally subjected to vacuum which removes the solid and detergent. It is clear that this process can also be applied to the system of FIG. 27 for materials such as clothes, mats, drapes and other items that can be conveyed by a moving belt. In such an adaption, the material is separately soaked in a detergent solution prior to ultrasonic exposure and the trough serves to collect both the fluid and soil.

In this embodiment, the piezoelectric crystals of the transducer can be cooled as shown in FIGS. 20-23. Instead of passing water through the channels 312, a solution of detergent or cleaning fluid can be used to cool the boron nitride powder, which in turn removes heat from the vibrating crystals. As noted above, the ability to hermetically seal the transducer enables this type of cleaning device to be commercially feasible without danger to the user.

Figure 29:
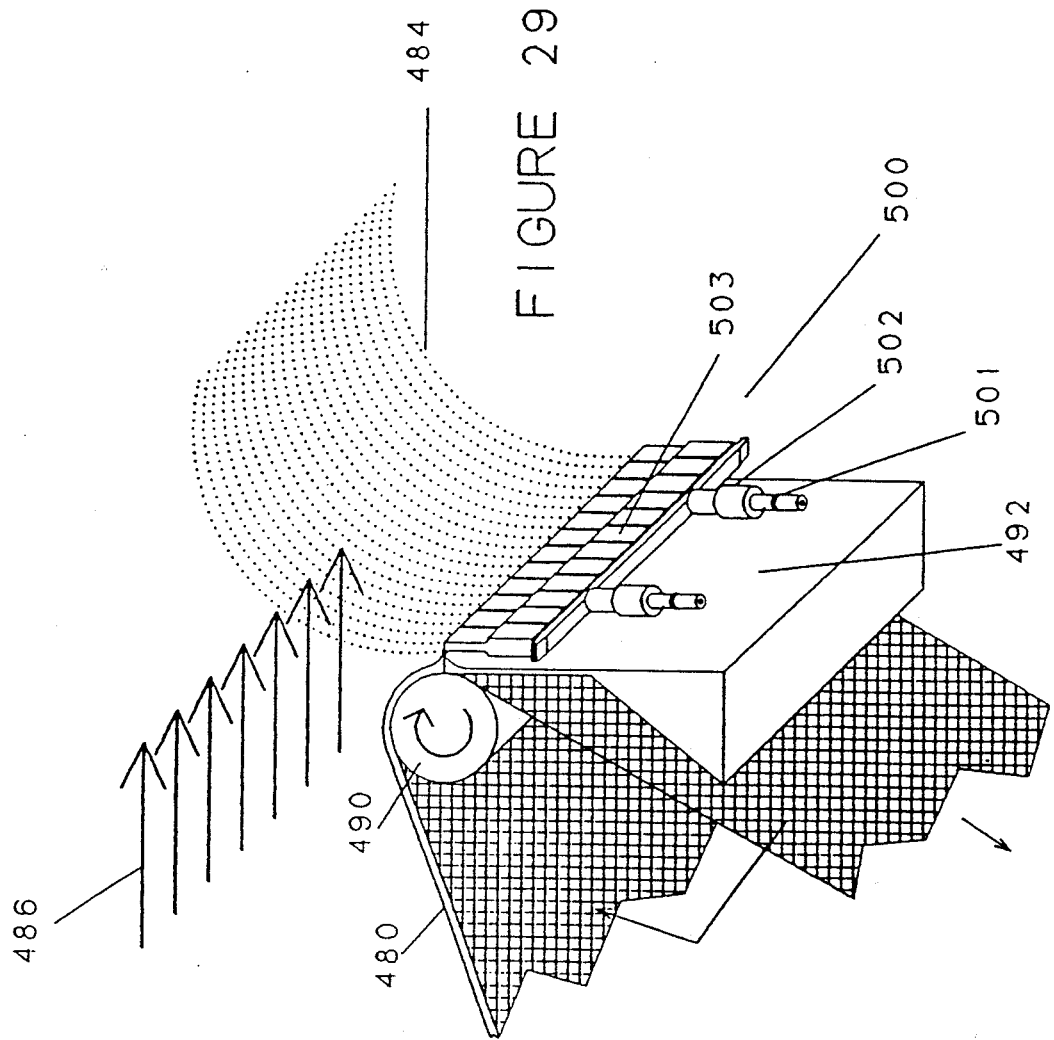
FIG. 29 is a perspective view of an apparatus for atomizing solid material utilizing an ultrasonic horn according to the invention.

FIG. 29 shows yet another application of ultrasonic vibration to a continuous process. In this system waste 480 such as sludge is conveyed on a belt 485 over a drum 490 rotating in the direction shown. The waste is then doctored off the drum by a scraping blade 492 onto the working face of the ultrasonic horn assembly 500, which includes transducer 501, resonator 502 and the horn 503 of FIG. 15. The intense vibration atomizes the waste 480 and expels it in the form of a mist 484 which is directed by an air stream 486 to an incinerator where it is combusted. Such ultrasonic atomization greatly increases the rate at which the waste dries and converts its solid condition on the belt into a form that, because of greatly increased surface area, can more readily burn.

While it is apparent that the invention herein disclosed is well calculated to fulfill the objects above stated, it will be appreciated that numerous modifications and embodiments may be devised by those skilled in the art. For example, other process applications can be selected for the novel horns of this invention. Welding, slitting, cutting, and other operations can easily be achieved over wide widths in a device which provides uniform vibration over such width. Also, a plurality of such operations can be combined in a single device. It is intended that the appended claims cover all such modifications and embodiments as fall within the true spirit and scope of the present invention.

I claim:

1. A method for subjecting at least one material having a width of at least about 12 inches to ultrasonic vibrations of a frequency of greater than 18 kHz which comprises:
   constructing a unitary vibration generating apparatus having a width which is substantially the same as the material to be treated;
   generating vibrations from said vibration generating apparatus which do not vary in amplitude by more than ±10% across said width; and
   passing said material between said vibration generating apparatus and a support member to subject a portion of the material to said ultrasonic vibrations.

2. The method of claim 1 wherein said at least one material comprises two separate sheet materials and which method further comprises at least partially bonding said sheet materials together.

3. The method of claim 1 wherein the support member is a rotating element and which method further comprises compressing at least portion of said at least one material between said rotating element and vibration generating apparatus.

4. The method of claim 3 wherein said at least one material comprises two separate thermoplastic sheets and which method further comprises at least partially laminating said sheet materials together.

5. The method of claim 4 wherein one of said rotating element or vibration generating apparatus includes a pattern and which method further comprises imparting said pattern upon said laminate.

6. The method of claim 3 wherein said at least one material is discontinuous and which method further comprises forming said material as an integral sheet by passing said vibrations through said discontinuous material.

7. The method of claim 1 wherein said material is cut in one or more locations when passing between said vibration generation apparatus and support member.

8. A method for subjecting at least one material having a width of at least about 12 inches to ultrasonic vibrations of a frequency of greater than 18 kHz which comprises:
   constructing a unitary vibration generating apparatus having a width which is substantially the same as the material to be treated;
   generating vibrations from said vibration generating apparatus which do not vary by more than +10% across said width; and
   passing said material between said vibration generating apparatus and a support member to subject a portion of the material to said ultrasonic vibrations, wherein said material includes a mixture of solid and liquid components and which method further comprises
   separating said liquid component from said solid component when said material passes between said vibration generation apparatus and said support member.

9. The method of claim 8 which further comprises spacing said support member a predetermined distance from said material.

10. The method of claim 9 which further comprises applying a vacuum to said support to assist in the separation of the liquid component from the solid component.

11. The method of claim 1 wherein the material is a plurality of fibers and which method further comprises conveying said fibers to said vibration generating apparatus and forming a fabric as said fibers pass between said vibration generating apparatus and support member.

12. The method of claim 11 which further comprises imparting a pattern into said fabric.

13. A method for subjecting at least one material having a width of at least about 12 inches to ultrasonic vibrations of a frequency of greater than 18 kHz which comprises:
   constructing a unitary vibration generating apparatus having a width which is substantially the same as the material to be treated;
   generating vibrations from said vibration generating apparatus which do not vary by more than +10% across said width; and
   passing said material between said vibration generating apparatus and a support member to subject a portion of the material to said ultrasonic vibrations, wherein said support member includes a rotating element in combination with means for scraping said material from said rotating element, and which method further comprises atomizing said material into particles as it passes by said rotating element, scraping means and vibration generating means.

14. The method of claim 1 wherein said material is a metal sheet and which method further comprises finishing said metal sheet to a final dimension and condition.

15. The method of claim 14 wherein said finishing step includes one or more of rolling, grinding, deburring, machining or cleaning said material.

16. The method of claim 11 wherein said material is a particulate solid and which method further comprises compacting said articulate solid as it passes between said vibration generating apparatus and support member.

17. The method of claim 1 wherein said material includes two sheets and which method further comprises joining said sheets as they pass between said vibration generating apparatus and support member.

18. The method of claim 17 wherein said sheets are welded or soldered together after passing between said vibration generating apparatus and support member.

19. The method of claim 1 which further comprises cleaning said material as it passes between said vibration generating apparatus and support member.

20. The method of claim 19 which further comprises applying a liquid to said material before or as said material passes between said vibration generating apparatus and said support member.

21. The method of claim 20 wherein said cleaning step includes removing said applied liquid as or after the material passes between said vibration generating apparatus and support member.

22. A method for subjecting at least one material having a width of at least about 12 inches to ultrasonic vibrations which comprises:

constructing a unitary vibration generating apparatus comprising means for generating vibrations in a first direction; a spine member having first and second ends and being operatively associated with the vibration generating means, said spine member being oriented perpendicular to the direction of said generated vibrations; and a plurality of tine members having a working end for transmitting said generated vibrations and extending perpendicularly from said spine member in the direction of said generated vibrations, each tine member positioned and attached at an antinode location along said spine member and having a length of $n\Gamma/2$ wherein n is an integer and $\Gamma$ is equal to $c/f$ where c is the velocity of sound in the apparatus and f is the chosen frequency of vibration, wherein first and second tine members positioned on said spine member opposite the attachment of said vibration generation means are attached at their working end but are otherwise separated by a space extending along their length; and wherein each other tine member is connected to adjacent tine members only at points along their length of $n\Gamma/4$ wherein n is an odd integer; said other tine members forming a symmetrical pattern on each side of a plane passing vertically between said first and second tine members; wherein the working end of each tine member other than said first and second tine members is separated from the working end of each adjacent tine members; said vibration generating apparatus having a width which is substantially the same as the material to be treated;

generating vibrations from said vibration generating apparatus which do not vary by more than ±10% across said width; and passing said material between said vibration generating apparatus and a support member to subject a portion of the material to said ultrasonic vibrations.

23. A method for subjecting at least one material having a width of at least about 12 inches to ultrasonic vibrations which comprises:

constructing a unitary vibration generating apparatus comprising means for generating vibrations in a first direction; a spine member having first and second ends and being operatively associated with the vibration generating means, said spine member being oriented perpendicular to the direction of said generated vibrations; and a plurality of tine members having a working end for transmitting said generated vibrations and extending perpendicularly from said spine member in the direction of said generated vibrations, wherein each tine member is positioned and attached at every other antinode location along said spine member so that each tine member vibrates in the same direction, each tine member having length of $n\Gamma/2$ wherein n is an integer and $\Gamma$ is equal to $c/f$ where c is the velocity of sound in the apparatus and f is the chosen frequency of vibration, and further wherein each tine member is attached at its working end to each adjacent tine member but is separated therefrom by a slot extending substantially along its length, thus forming a unitary working end for the apparatus; said vibration generating apparatus having a width which is substantially the same as the material to be treated;

generating vibrations from said vibration generating apparatus which do not vary by more than ±10% across said width; and passing said material between said vibration generating apparatus and a support member to subject a portion of the material to said ultrasonic vibrations.

24. A method for subjecting at least one material having a width of at least about 12 inches to ultrasonic vibrations which comprises:

constructing a unitary vibration generating apparatus comprising a spine member having first and second ends and being operatively associated with the vibration generating means, said spine member being oriented perpendicular to the direction of said generated vibrations; a plurality of tine members having a working end for transmitting said generated vibrations and extending perpendicularly from said spine member in the direction of said generated vibrations, each tine member positioned and attached at an antinode location along said elongated member and having a length of $n\Gamma/2$ wherein n is an integer and $\Gamma$ is equal to $c/f$ where c is the velocity of sound in the apparatus and f is the chosen frequency of vibration, wherein first and second tine members positioned on said elongated member opposite the attachment of said vibration generation means are attached at their working end but are otherwise separated by a space extending along their length; and wherein each other tine member is connected too adjacent tine members only at points along their length of $n\Gamma/4$ wherein n is an odd integer; said other tine members forming a symmetrical pattern on each side of a plane passing vertically between the midpoint of the spine member; wherein the working end of each tine member other than said first and second tine members is separated from the working end of each adjacent tine member; and a plurality of half wavelength extensional resonators mounted symmetrically on said spine member about said plane of symmetry; said vibration generating apparatus having a width which is substantially the same as the material to be treated;

generating vibrations from said vibration generating apparatus which do not vary by more than ±10% across said width; and passing said material between said vibration generating apparatus and a support member to subject a portion of the material to said ultrasonic vibrations.

25. A method for creating an ultrasonic vibrational field, which comprises:

generating vibrations in a first direction;

vibrating a spine member with the vibrations to generate node and antinode locations along the spine member, the spine member being oriented substantially perpendicular to the first direction;

vibrating a plurality of tine members having first ends attached to the spine member at antinode locations along the spine member, and second ends attached to adjacent tine members, wherein adjacent tine members are separated along part of their lengths;

selecting the frequency of vibrations to equal nc/2L, where n is an integer, c is the speed of sound in the spine and tine members, and L is the length of the tine members; and subjecting a material to the ultrasonic vibrations which are generated by the second ends of the tine members.

26. The method of claim 25, wherein the attached second ends of the tine members form a horn face, and which further comprises locating the horn face proximate to a material to subject the material to ultrasonic vibration.

27. The method of claim 26, wherein the material is a plurality of thermoplastic sheets and which further comprises welding the sheets together with the ultrasonic vibration.

28. The method of claim 26, wherein the material is a gauze comprising fibers and which further comprises welding the fibers together with the ultrasonic vibration.

29. The method of claim 26, wherein the material is a wet web and which further comprises drying the web with the ultrasonic vibration.

30. The method of claim 26, wherein the material is soiled and which further comprises loosening soil particles from the material with the ultrasonic vibration, and removing the soil particles from the material by applying a detergent to the soiled material and vacuuming the material.

31. The method of claim 26, wherein the material is waste and which further comprises atomizing the waste to produce a mist and a dried waste, and removing the mist from the vicinity of the dried waste.

* * * * *